United States Patent
Lebedev et al.

(10) Patent No.: US 9,760,946 B1
(45) Date of Patent: Sep. 12, 2017

(54) METHODS AND APPARATUS FOR DETECTING GAPS IN A SEQUENCE OF MESSAGES, REQUESTING MISSING MESSAGES AND/OR RESPONDING TO REQUESTS FOR MESSAGES

(75) Inventors: Alexei Lebedev, New York, NY (US); Vladimir Parizhsky, New York, NY (US)

(73) Assignee: NYSE ARCA LLC, Chicago, IL (US)

( * ) Notice: Subject to any disclaimer, the term of this patent is extended or adjusted under 35 U.S.C. 154(b) by 123 days.

(21) Appl. No.: 13/289,873

(22) Filed: Nov. 4, 2011

Related U.S. Application Data

(60) Provisional application No. 61/552,414, filed on Oct. 27, 2011, provisional application No. 61/548,691, filed on Oct. 18, 2011, provisional application No. 61/543,798, filed on Oct. 5, 2011, provisional application No. 61/543,804, filed on Oct. 5, 2011, provisional application No. 61/543,309, filed on Oct. 4, 2011, provisional application No. 61/543,290, filed on Oct. 4, 2011, provisional application No.
(Continued)

(51) Int. Cl.
*G06Q 40/00* (2012.01)

(52) U.S. Cl.
CPC .................... *G06Q 40/00* (2013.01)

(58) Field of Classification Search
CPC ..................................................... H04L 67/10
USPC ................. 705/1.1, 37, 36 R, 30, 35, 26.41; 719/314; 709/203, 226, 315
See application file for complete search history.

(56) References Cited

U.S. PATENT DOCUMENTS 4,792,947 A   12/1988  Takiyasu et al.
5,519,704 A    5/1996  Farinacci et al.
(Continued)

FOREIGN PATENT DOCUMENTS

WO   WO2008020731   2/2008

OTHER PUBLICATIONS

U.S. Appl. No. 13/253,732, Methods and Apparatus for Performing Risk Checking, filed Oct. 5, 2011, pp. 1-27 including cover sheet.
(Continued)

*Primary Examiner* — John H Holly
(74) *Attorney, Agent, or Firm* — Michael P. Straub; Stephen T. Straub; Ronald P. Straub

(57) ABSTRACT

Features are directed to detecting a loss of message synchronization and/or messages e.g., between a trader system and an exchange system. Synchronization loss may be due to a connection being terminated for a period of time, a lost connection, etc., while a trading session is being maintained with the exchange system. Loss of message synchronization may relate to messages or other communication over a shared high speed low latency path within the exchange that is used for communicating transaction messages, e.g., order messages to be processed. To avoid introducing delays into communication with other traders who's transaction messages share the same high speed communications path within the exchange as the trader system with which message synchronization is lost, message gap fill to restore message synchronization with a trader system that lost synchronization is performed via a different communications path than the shared communications path used for communicating new transaction messages.

25 Claims, 18 Drawing Sheets

Related U.S. Application Data

61/543,304, filed on Oct. 4, 2011, provisional application No. 61/417,197, filed on Nov. 24, 2010, provisional application No. 61/426,490, filed on Dec. 22, 2010.

(56) References Cited

U.S. PATENT DOCUMENTS

| | | |
|---|---|---|
| 5,809,483 A | 9/1998 | Broka et al. |
| 6,430,616 B1 | 8/2002 | Brinnand et al. |
| 6,567,851 B1 | 5/2003 | Kobayashi |
| 6,938,021 B2 | 8/2005 | Shear et al. |
| 6,963,914 B1 | 11/2005 | Breitbart et al. |
| 6,965,883 B2 | 11/2005 | Xi et al. |
| 7,035,257 B2 | 4/2006 | Vafaei |
| 7,281,058 B1 | 10/2007 | Shepherd et al. |
| 7,613,160 B2 | 11/2009 | Kitchin |
| 7,685,281 B1 | 3/2010 | Saraiya et al. |
| 7,693,132 B1 | 4/2010 | Cooper et al. |
| 7,885,882 B1 | 2/2011 | Brander et al. |
| 8,060,598 B1 | 11/2011 | Cook et al. |
| 8,391,885 B2 | 3/2013 | Song et al. |
| 8,812,684 B1 | 8/2014 | Hood et al. |
| 2001/0049649 A1 | 12/2001 | Baecker et al. |
| 2002/0069155 A1 | 6/2002 | Nafeh et al. |
| 2002/0103732 A1 | 8/2002 | Bundy et al. |
| 2002/0103972 A1 | 8/2002 | Satran et al. |
| 2002/0161828 A1* | 10/2002 | Edison ............... G06F 9/54 709/203 |
| 2003/0007490 A1 | 1/2003 | Yi et al. |
| 2003/0050955 A1 | 3/2003 | Eatough et al. |
| 2003/0096605 A1 | 5/2003 | Schlieben et al. |
| 2003/0101283 A1 | 5/2003 | Lewis et al. |
| 2004/0019668 A1 | 1/2004 | Kakadia |
| 2004/0064351 A1* | 4/2004 | Mikurak ............ G06Q 10/087 705/22 |
| 2005/0149428 A1 | 7/2005 | Gooch et al. |
| 2005/0283427 A1 | 12/2005 | Owens et al. |
| 2006/0002391 A1 | 1/2006 | Takihiro et al. |
| 2006/0085317 A1 | 4/2006 | Allen |
| 2006/0133376 A1 | 6/2006 | Valdevit |
| 2006/0161625 A1 | 7/2006 | Norp et al. |
| 2006/0193300 A1 | 8/2006 | Rawat et al. |
| 2006/0223498 A1 | 10/2006 | Gallagher et al. |
| 2006/0259560 A1 | 11/2006 | Han et al. |
| 2006/0285527 A1 | 12/2006 | Gao et al. |
| 2006/0285528 A1 | 12/2006 | Gao et al. |
| 2007/0266170 A1 | 11/2007 | Mockett |
| 2008/0062948 A1 | 3/2008 | Ponnuswamy |
| 2008/0117911 A1 | 5/2008 | Rajakarunanayake et al. |
| 2009/0052450 A1 | 2/2009 | Mockett |
| 2009/0067358 A1 | 3/2009 | Fischer |
| 2009/0077567 A1* | 3/2009 | Craddock ........... G06F 13/4022 719/314 |
| 2009/0132410 A1 | 5/2009 | Penney et al. |
| 2009/0157797 A1 | 6/2009 | Chang et al. |
| 2009/0164648 A1 | 6/2009 | Xu et al. |
| 2009/0219945 A1 | 9/2009 | Blagojevic et al. |
| 2009/0248886 A1 | 10/2009 | Tan et al. |
| 2009/0281954 A1 | 11/2009 | Waelbroeck et al. |
| 2009/0282111 A1 | 11/2009 | Jacobs et al. |
| 2009/0290575 A1 | 11/2009 | Simon |
| 2010/0014519 A1 | 1/2010 | Gutierrez |
| 2010/0017673 A1 | 1/2010 | Lu et al. |
| 2010/0058118 A1 | 3/2010 | Yamaoka |
| 2010/0094743 A1 | 4/2010 | Robertson et al. |
| 2010/0106851 A1 | 4/2010 | Aoki et al. |
| 2010/0115099 A1 | 5/2010 | Gu et al. |
| 2010/0202453 A1 | 8/2010 | Bauza et al. |
| 2010/0220709 A1 | 9/2010 | Peisa |
| 2011/0040669 A1 | 2/2011 | Lee et al. |
| 2011/0126060 A1 | 5/2011 | Grube et al. |
| 2011/0166982 A1 | 7/2011 | Cole et al. |
| 2011/0178915 A1* | 7/2011 | Vinokour ............ G06Q 40/06 705/37 |
| 2011/0252152 A1 | 10/2011 | Sherry et al. |
| 2011/0264578 A1 | 10/2011 | Chapman et al. |
| 2011/0305170 A1 | 12/2011 | Lai et al. |
| 2013/0117426 A1 | 5/2013 | Saraiya et al. |

OTHER PUBLICATIONS

U.S. Appl. No. 13/289,818, Messaging Methods and Apparatus for Use With an Exchange System and/or Client Devices, filed Nov. 4, 2011, pp. 1-67 including cover sheet.

U.S. Appl. No. 13/289,891, Methods and Apparatus for Using Multicast Messaging in a System for Implementing Transactions, filed Nov. 4, 2011, pp. 1-88 including cover sheet.

U.S. Appl. No. 13/289,777, Methods and Apparatus for Requesting Message Gap Fill Requests and Responding to Message Gap Fill Requests, filed Nov. 4, 2011, pp. 1-82 including cover sheet.

\* cited by examiner

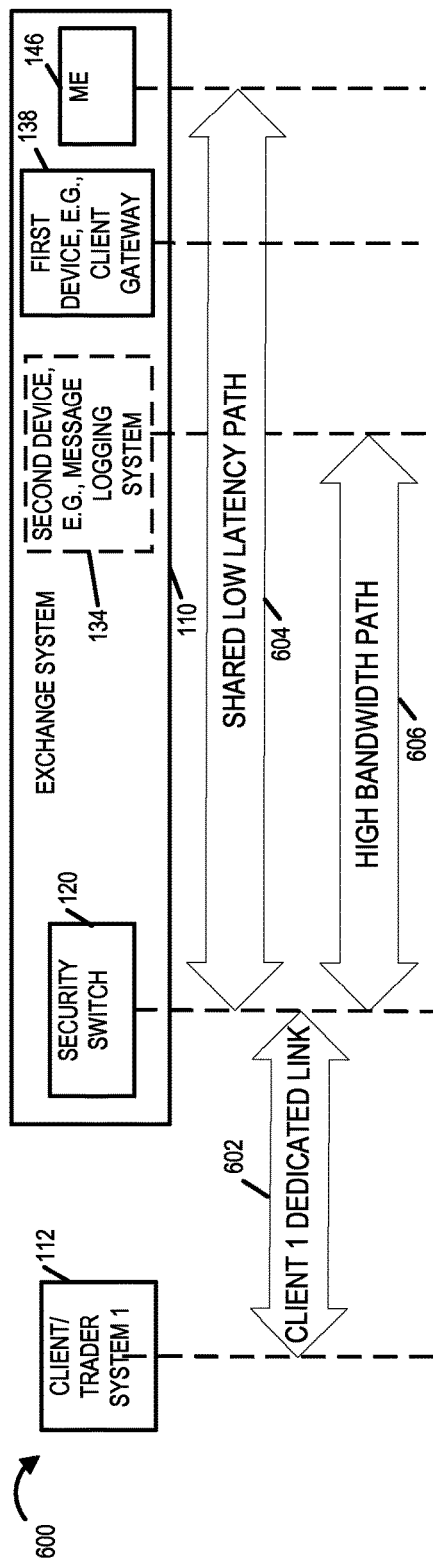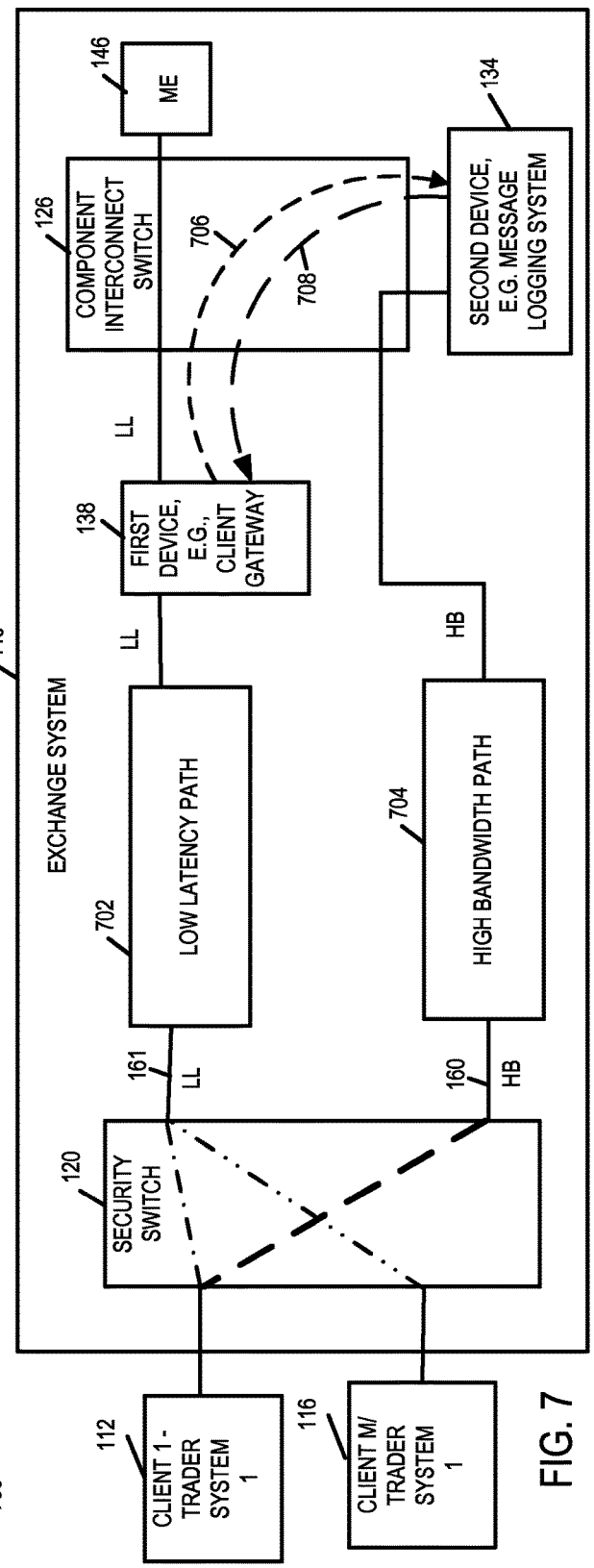

METHODS AND APPARATUS FOR DETECTING GAPS IN A SEQUENCE OF MESSAGES, REQUESTING MISSING MESSAGES AND/OR RESPONDING TO REQUESTS FOR MESSAGES

RELATED APPLICATIONS

The present application claims the benefit of the filing date of U.S. Provisional Patent Application Ser. No. 61/552,414, filed on Oct. 27, 2011 and titled "METHODS AND APPARATUS FOR USING MULTICAST MESSAGING IN A SYSTEM FOR IMPLEMENTING TRANSACTIONS"; claims the benefit of the filing date of U.S. Provisional Patent Application Ser. No. 61/548,691, filed on Oct. 18, 2011 and titled "MESSAGING METHODS AND APPARATUS FOR USE IN AN EXCHANGE SYSTEM"; claims the benefit of the filing date of U.S. Provisional Patent Application Ser. No. 61/543,798, filed on Oct. 5, 2011 and titled "MESSAGING METHODS AND APPARATUS FOR USE IN AN EXCHANGE SYSTEM"; claims the benefit of the filing date of U.S. Provisional Patent Application Ser. No. 61/543,804, filed on Oct. 5, 2011 and titled "METHODS AND APPARATUS FOR USING MULTICAST MESSAGING IN A SYSTEM FOR IMPLEMENTING TRANSACTIONS"; claims the benefit of the filing date of U.S. Provisional Patent Application Ser. No. 61/543,309, filed on Oct. 4, 2011 and titled "METHODS AND APPARATUS FOR USING MULTICAST MESSAGING IN A SYSTEM FOR IMPLEMENTING TRANSACTIONS"; claims the benefit of the filing date of U.S. Provisional Patent Application Ser. No. 61/543,290, filed on Oct. 4, 2011 and titled "METHODS AND APPARATUS FOR PERFORMING RISK CHECKING"; claims the benefit of the filing date of U.S. Provisional Patent Application Ser. No. 61/543,304, filed on Oct. 4, 2011 and titled "MESSAGING METHODS AND APPARATUS FOR USE IN AN EXCHANGE SYSTEM"; claims the benefit of the filing date of U.S. Provisional Patent Application Ser. No. 61/417,197, filed on Nov. 24, 2010 and titled "METHODS AND APPARATUS FOR PERFORMING RISK CHECKING UNDER BROKER CONTROL"; claims the benefit of the filing date of U.S. Provisional Patent Application Ser. No. 61/426,490, filed on Dec. 22, 2010 and titled "MESSAGING METHODS AND APPARATUS FOR RESTORING MESSAGE SYNCHRONIZATION BETWEEN A TRADER'S SYSTEM AND AN ELECTRONIC COMMUNICATIONS NETWORK"; all of which are hereby expressly incorporated by reference in their entirety.

FIELD

The present application relates to messaging methods and apparatus and, more particularly, to methods and apparatus for detecting that messages may be missing from a sequences of messages, to requesting messages in response to detecting a possible gap in received messages, and/or to supplying messages in response to a request for messages, e.g., a gap fill request.

BACKGROUND

Electronic exchanges, implemented as Electronic Communication Networks (ECNs), are often used to electronically trade a wide range of commodities, stocks and/or other items having real world significance. An ECN normally receives messages, e.g., an order from a trader, performs a matching operation, and if a matching order exists, performs a trade. The resulting trade is reported to the traders which placed the matching orders and also to a public system, e.g., for updating published information about the current price of a stock, commodity or other item being traded on the exchange.

Electronic trading on an electronic exchange allows for large numbers of orders to be stored, processed, and executed at relatively low cost. The speed at which a trade can be executed is important since a delay in processing of a message including an order to buy or sell may affect the dollar amount at which the trade is made.

In the event that a trader's system, referred to herein as a trader system, or the ECN detect a miss-match in sequence numbers, indicating that either the trader system or the ECN has lost one or more messages, action to resolve the sequence number miss-match is often required. This often involves the system with the higher message sequence number communicating the messages which are missing from the other device's records.

The playback of lost or missing messages may involve a fair amount of communication given that trading sessions may go on for a long period of time, e.g., several days, and a large number of messages may be missing, e.g., as indicated by a large gap between the message sequence number used by one device and the higher message sequence number known to the other device based on previously received or transmitted messages.

The communications path between the gateway device and a trader's system is intended to be a relatively high speed communications path. A portion of the high speed communications path with the gateway may be shared by multiple traders. The messages transmitted on the high speed communications path to the client gateway are usually relatively small in terms of the amount of data they communicate. While individual messages may be short in duration, the playback of a large number of messages in order to provide a device with missing messages may place a strain on the bandwidth of the high speed communications path with the client gateway which may interfere or delay the transmission of new trading messages, e.g., orders to buy or sell a stock.

In view of the above, it should be appreciated that there is a need for improved methods of detecting a loss or failure to receive messages in a sequence, for improved methods and/or apparatus for requesting missing messages and/or for improved methods and/or apparatus for responding to requests for missing messages.

While there is much room for improvement it should be appreciated that systems and apparatus which address one or more of the above issues are useful and desirable and that all embodiments need not address all of the above discussed problems.

SUMMARY

Methods and apparatus directed to detecting a loss of message synchronization and/or messages either between the trader system and an exchange system or loss of message synchronization from the exchange to the trader system are described. Methods and apparatus for detecting loss of message synchronization between elements of the exchange system are also described.

Synchronization loss may be due to a connection being terminated for a period of time, a lost connection, etc., while a trading session is being maintained with the exchange system. The loss of message synchronization may relate to messages or other communication over a shared high speed low latency path within the exchange that is used for communicating transaction messages, e.g., order messages to be processed. To avoid introducing delays into communication with other traders who's transaction messages share the same high speed communications path within the exchange as the trader system with which message synchronization is lost, message gap fill to restore message synchronization with a trader system that lost synchronization is performed via a different communications path than the shared communications path used for communicating new transaction messages. The communications path used with the exchange to support gap fill operations may be a high bandwidth path that avoids the shared low latency communications path used for communicating new transaction messages. While different communications paths may be used in the exchange for new transaction messages, e.g., orders, than is used to supply or receive gap fill messages, e.g., previous messages, both the communications path used for new transaction messages and the communications path used for gap fill messages may both use the same external connection to the trader. That is, the path between the trader and a security switch in the exchange which is not shared with other clients and/or traders is normally the same for both new transaction messages and gap fill messages while the exchange is implemented in such a way that the shared high speed communications path used for new transaction messages is avoided for gap fill operations.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 6 illustrates an example showing an exemplary low latency communications path and an exemplary higher bandwidth communications path between a trader system and a gateway/second device.

FIG. 7 illustrates an example showing an exemplary low latency communications path and an exemplary higher bandwidth communications path between a trader system and a gateway/second device.

DETAILED DESCRIPTION

Figure 1:
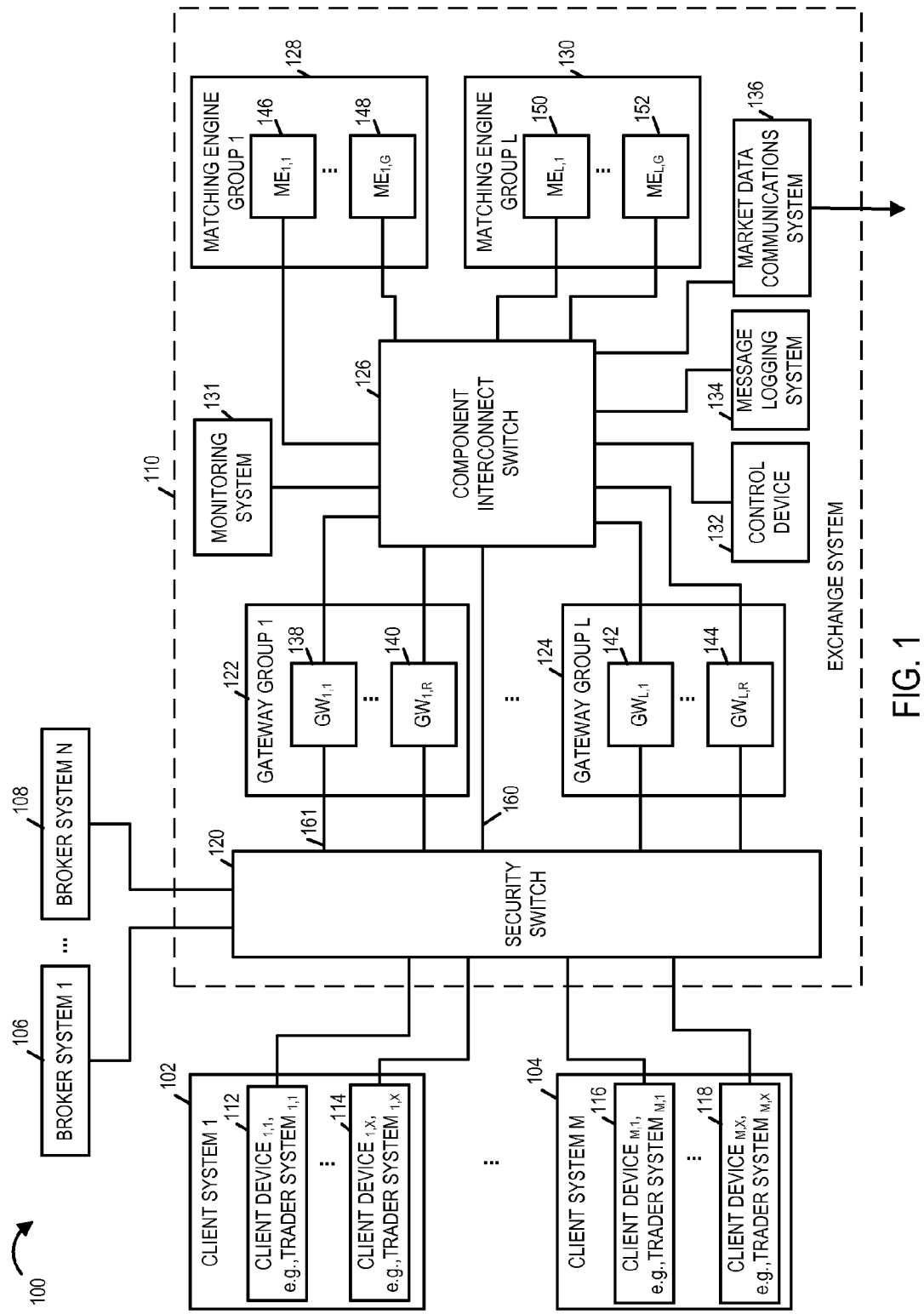
FIG. 1 is a drawing of an exemplary system, e.g., a trading system, for implementing transactions in accordance with an exemplary embodiment.

FIG. 1 is a drawing of an exemplary system 100, e.g., a trading system, for implementing transactions in accordance with an exemplary embodiment. Exemplary system 100 includes a plurality of client systems (client system 1 102, . . . , client system M 104), a plurality of broker systems (broker system 1 106, . . . , broker system N 108), and an exchange system 110. Client system 1 102 includes a plurality of client devices (client device$_{1,1}$ 112, e.g., trader system$_{1,1}$, . . . , client device$_{1,X}$ 114, e.g., trader system$_{1,X}$). Client system M 104 includes a plurality of client devices (client device$_{M,1}$ 116, e.g., trader system$_{M,1}$, . . . , client device$_{M,X}$ 118, e.g., trader system$_{M,X}$). Exchange system 110 includes a security switch 120, a plurality of gateway groups (Gateway group 1 122, . . . , Gateway group L 124), a component interconnect switch 126, a plurality of matching engine groups (matching engine group 1 128, . . . , matching engine group L 130), a monitoring system 131, a control device 132, a message logging system 134, and a market data communications system 136. Gateway group 1 122 includes a plurality of gateways (GW$_{1,1}$ 138, . . . GW$_{1,R}$ 140). Gateway group L 124 includes a plurality of gateways (GW$_{L,1}$ 142, . . . GW$_{L,R}$ 144). Matching engine group 1 128 includes a plurality of matching engines (ME$_{1,1}$ 146, . . . ME$_{1,G}$ 148). Matching engine group L 130 includes a plurality of matching engines (ME$_{L,1}$ 150, . . . ME$_{L,G}$ 152). The trader systems (112, . . . , 114, 116, . . . , 118), broker systems (106, . . . , 108) and gateways (138, . . . , 140, 142, . . . , 144) are coupled to the security switch. The gateways (138, . . . , 140, 142, . . . , 144), matching engines (146, . . . , 148, 150, . . . , 152), control device 132, message logging system 134, and market data communications system 136 are coupled to the component interconnect switch 126. Connection 160 couples the component interconnect switch 126 to the security switch 120.

Figure 2:
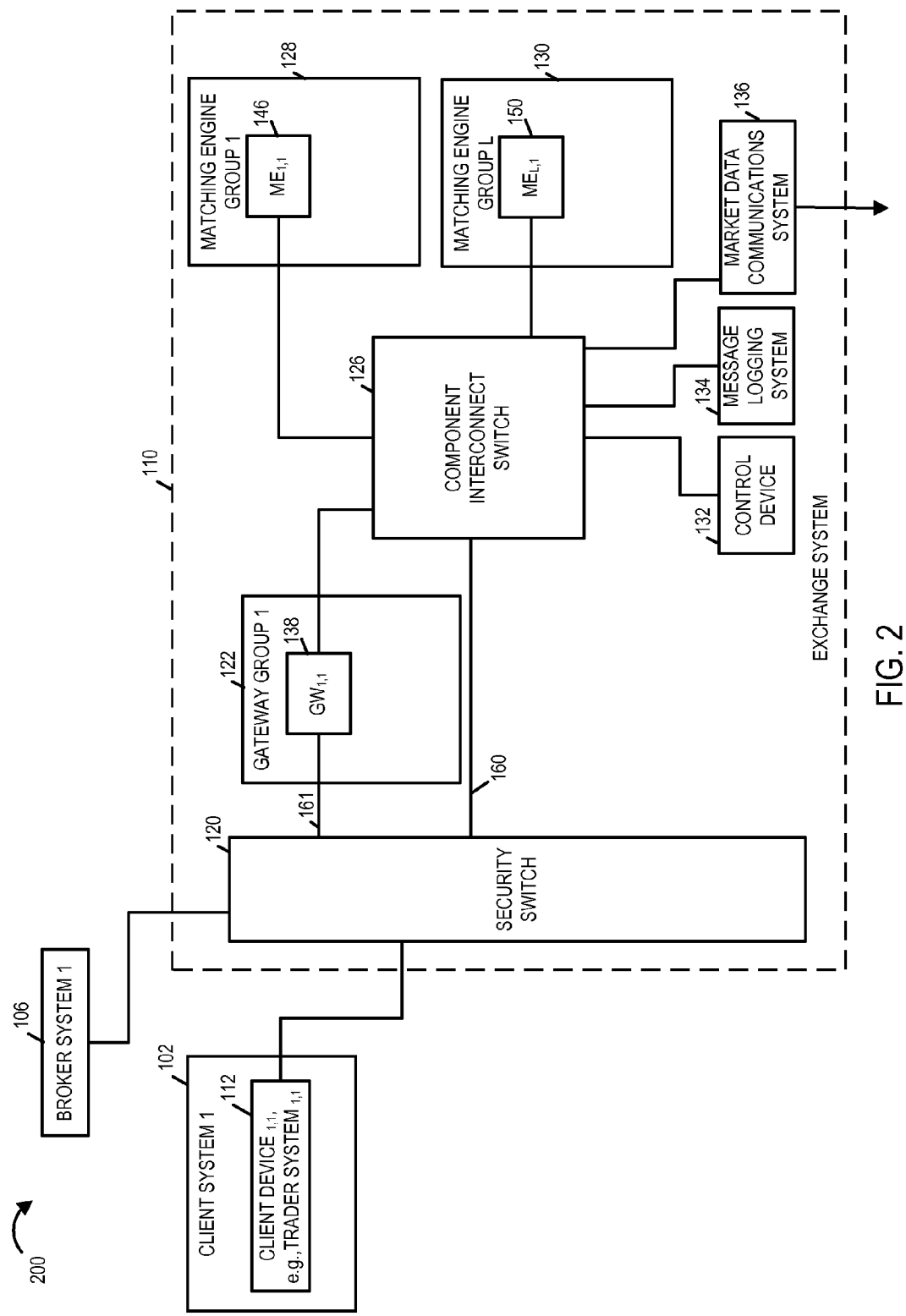
FIG. 2 is a simplified drawing illustrating some of the elements of exemplary system of FIG. 1.

Drawing 200 of FIG. 2 is a simplified drawing illustrating some of the elements of exemplary system 100 of FIG. 1. Client device 112, e.g., a trader system, logs into the exchange system 110 via gateway 138 and starts an ongoing session. In response to the session login, the gateway device 138 provides the client device 112 with (i) an exchange system to client device message sequence number and (ii) a client device to exchange system message sequence number corresponding to each of one or more message streams. In some embodiments, each message stream corresponds to a matching engine. The client device should include the provided client device to exchange system message sequence number in the first client device to exchange system message that it sends to the exchange system. The gateway 138 checks the first client device to exchange system message that it receives from the client device 112 to determine if the provided client device to exchange system message sequence number was included.

In some embodiments, a path, a shared low latency path, including connection 161 is used for communicating new transaction messages from gateway 138 to client device 112. In some embodiments, a path, e.g., a high bandwidth path, including connection 160 is used during message gap fill operations, e.g., when communicating stored messages from message logging system 134 to a client device, e.g., client device 112.

Figures 3, 3A, 3B:
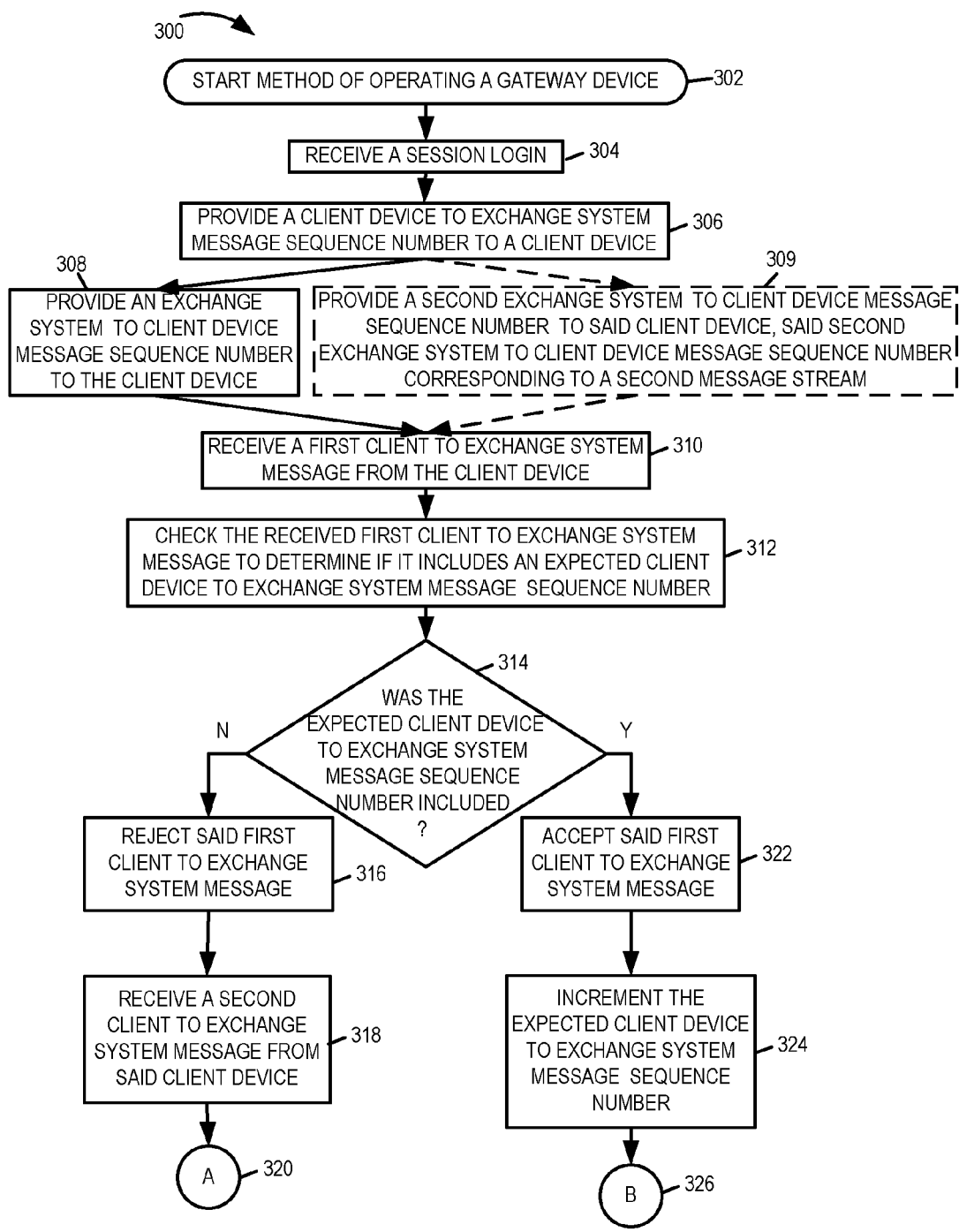
FIG. 3, comprising the combination of FIG. 3A and FIG. 3B, is a flowchart of an exemplary method of operating a gateway device in accordance with an exemplary embodiment.
Figure 3B:
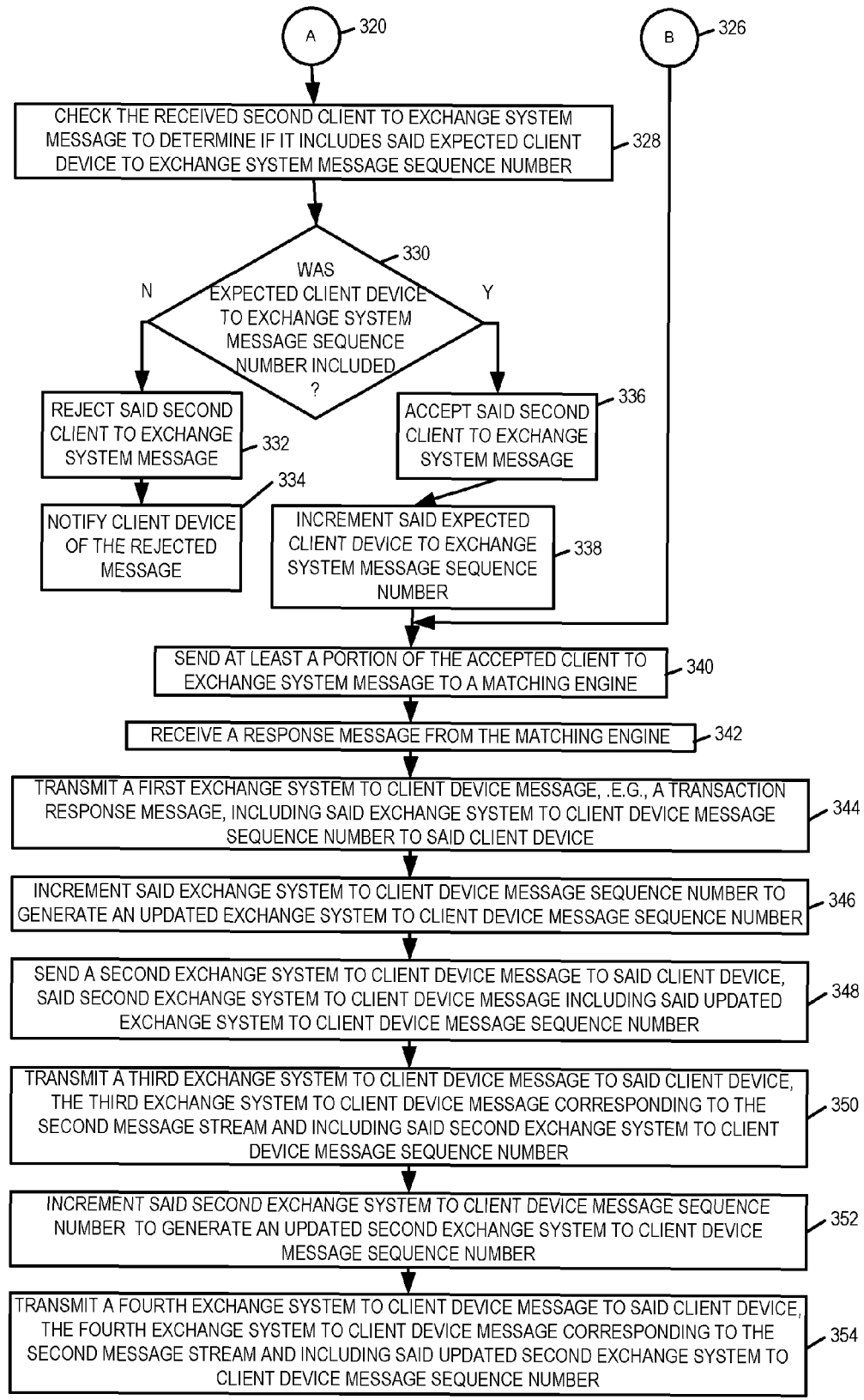

FIG. 3, comprising the combination of FIG. 3A and FIG. 3B, is a flowchart 300 of an exemplary method of operating a gateway device in accordance with an exemplary embodiment. The gateway device implementing the method of flowchart 300 is, e.g., a gateway device of an exchange system.

Operation of the exemplary method starts in step 302, where the gateway device is powered on and initialized. Operation proceeds from step 302 to step 304. In step 304 the gateway device receives a session login. Then, in step 306 the gateway device provides a client device to exchange system message sequence number to a client device. In various embodiments, the client device to exchange system message sequence number, e.g., of step 306, is provided in response to a session login, e.g., of step 304, and the provided client device to exchange system message sequence is provided for inclusion in the next client to exchange system message.

Operation proceeds from step 306 to step 308, and in some embodiments, to step 309. In step 308 the gateway device provides an exchange system to client device message sequence number to the client device. In some embodiments, the exchange system to client device message sequence number provided in step 308 corresponds to a first message stream. In step 309 the gateway device provides a second exchange system to client device message sequence number to said client device, said second exchange system to client device message sequence number corresponding to a second message stream. For example, the provided exchange system to client device message sequence number of step 308 may correspond to a first message stream corresponding to a first matching engine group and the client device, while the provided second exchange system to client device message sequence number of step 309 may correspond to the a second matching engine group and the client device. In various embodiments, a client device may have more than two exchange system to client device message streams and may be provided with an exchange system to client device message sequence number corresponding to each stream, e.g., message streams corresponding to more than two matching engine groups. Operation proceeds from step 308 and step 309 to step 310.

In step 310 the gateway device receives a first client to exchange system message from the client device. In some embodiments, the received first client to exchange system message includes an uninterpreted field, said uninterpreted field including client device supplied information which is to be returned without alternation to said client device in any response message corresponding to said received first client to exchange system message. In some such embodiments, the uninterpreted field includes information used by the client device or a broker to identify or track client to exchange messages and/or identify individuals upon who's behalf a trader is implementing an order or other transaction.

In some but not necessarily all embodiments, a client device, e.g., trader device, to exchange message includes a field for communicating information which is useful to the trader and/or broker associated with the trader. The field is referred to, in some embodiments, as an uninterpreted field since it is not interpreted or used by the exchange system to control message processing and/or other exchange system functions. The content of the uninterpreted field is passed through various devices in the exchange system and echoed back to the client/trader device in one or more response messages sent by the exchange in response to a transaction message. It should be appreciated that the client, e.g., trader device, can be used to place orders corresponding to multiple different individuals. The uninterpreted message field allows the trader device to include in transaction messages information identifying the individual customer to which the transaction message generated by the trader system corresponds and/or other information such as a client order number. Since this information is returned to the trader system, the trader device can, and in some embodiments does, use the returned information from the uninterpreted field to easily match and/or route content of transaction response messages from the exchange to an individual customer. While from the exchange perspective, the trader device is treated as a single entity for transaction purposes, the trader device and/or system is able to easily and transparently separate and route or forward information from transaction response messages to individual customers of the trader system to which the messages relate. The information included in the uninterpreted field transaction messages sent to an exchange and transaction response messages received from an exchange may, and in some embodiments is, encrypted or otherwise scrambled to render it meaningless to the exchange system. However, encryption and/or scrambling of the content of the uninterpreted field is optional. The uninterpreted field allows a trader system and/or device, to maintain and use a message numbering system with their individual clients which is independent of the message numbering system used for client device to exchange system messages and exchange responses to such messages. In fact, in most if not all embodiments, an individual customer who is being serviced by a trader using a client device such as a trader system may be shielded from, and not provided with, information on the numbering of messages used between the exchange and client device with message numbering information from the uninterpreted field being used for purposes of communicating with an individual client instead. The uninterpreted field may be relatively large in size, e.g., hundreds or even thousands of bits long, allowing the trader device to communicate and echo back several bytes of information. The size of the field may vary depending on the amount of information communicated. A size indicator indicating the size of the uninterpreted field is included in some embodiments in messages from a client device to the exchange system thereby allowing the exchange to easily determine the size of the field in such embodiments. In some other embodiments the size of the uninterpreted field is fixed and known to both client device and exchange system.

Operation proceeds from step 310 to step 312. In step 312 the gateway device checks the received first client to exchange system to determine if it includes an expected client device to exchange system message sequence number. In various embodiments, the expected client device to exchange system sequence number is the provided client device to exchange system message sequence number of step 306. Operation proceeds from step 312 to step 314. In step 314, if the determination of step 312 was that the expected client device to exchange system message sequence number as included in the received first client to exchange system message, then operation proceeds from step 314 to step 322; otherwise, operation proceeds from step 314 to step 316.

In step 316 the gateway device rejects said first client to exchange system message. Then, in step 318 the gateway device receives a second client to exchange system message from the client device. Operation proceeds from step 318 to step 328, via connecting node A 320. In step 328 the gateway device checks the received second client device to exchange system message to determine if it includes said expected client device to exchange system message sequence number. Operation proceeds from step 328 to step 330. In step 330, if the determination of step 328 was that the expected client device to exchange system message sequence number as included in the received second client to exchange system message, then operation proceeds from step 330 to step 336; otherwise; operation, proceeds from step 330 to step 332. In step 332 the gateway device rejects said second client to exchange system message. Then, in step 334 the gateway device notifies the client device of the rejected message.

Returning to step 322, in step 322 the gateway device accepts the first client to exchange system message. Operation proceeds from step 322 to step 324 in which the gateway device increments the expected client device to exchange system message sequence number. Operation proceeds from step 324, via connecting node B 326, to step 340.

Returning to step 336, in step 336, the gateway device accepts said second client to exchange system message. Then, in step 338 the gateway device increments said expected client device to exchange system message sequence number. Operation proceeds from step 338 to step 340.

In step 340, the gateway sends at least a portion of the accepted client of exchange system message, e.g., first client to exchange system message of step 322 or second client to exchange system message of step 336, to a matching engine. Operation proceeds from step 340 to step 342 in which the gateway device receives a response from the matching engine. Operation proceeds from step 342 to step 344. In step 344 the gateway device transmits a first exchange system to client device message, e.g., a transaction response message, including said exchange system to client device message sequence number, e.g., the exchange system to client device message sequence number provided in step 308, to said client device. In some embodiments, the transaction response message is sent to the client device in step 344 is in response to the first client to exchange system message, and the transaction response message includes the content of said uninterpreted field, which was received from the client device, in addition to at least one of an order acknowledgement and order completion information.

Operation proceeds from step 344 to step 346 in which the gateway device increments the exchange system to client device message sequence number to generate an updated exchange system to client device message sequence number. Then, in step 348 the gateway device sends a second exchange system to client device message to said client device, said exchange system to client device message including said updated exchange system to client device message sequence number. In various embodiments, the first and second exchange system to client device messages correspond to the same message stream. In various embodiments, the second exchange system to client device message is the next exchange system to client device message sent after the first exchange system to client device message.

Operation proceeds from step 348 to step 350. In step 350 the gateway device transmits a third exchange system to client device message to said client device, the third exchange system to client device message corresponding to the second message stream and including the second exchange system to client device message sequence number. Operation proceeds from step 350 to step 352. In step 352 the gateway device increments said second exchange system to client device message sequence number to generate an updated second exchange system to client device message sequence number. Then in step 354 the gateway device transmits a fourth exchange system to client device message to said client device, the fourth exchange system to client device message corresponding to the second message stream and including said updated second exchange system to client device message sequence number.

Figure 4:
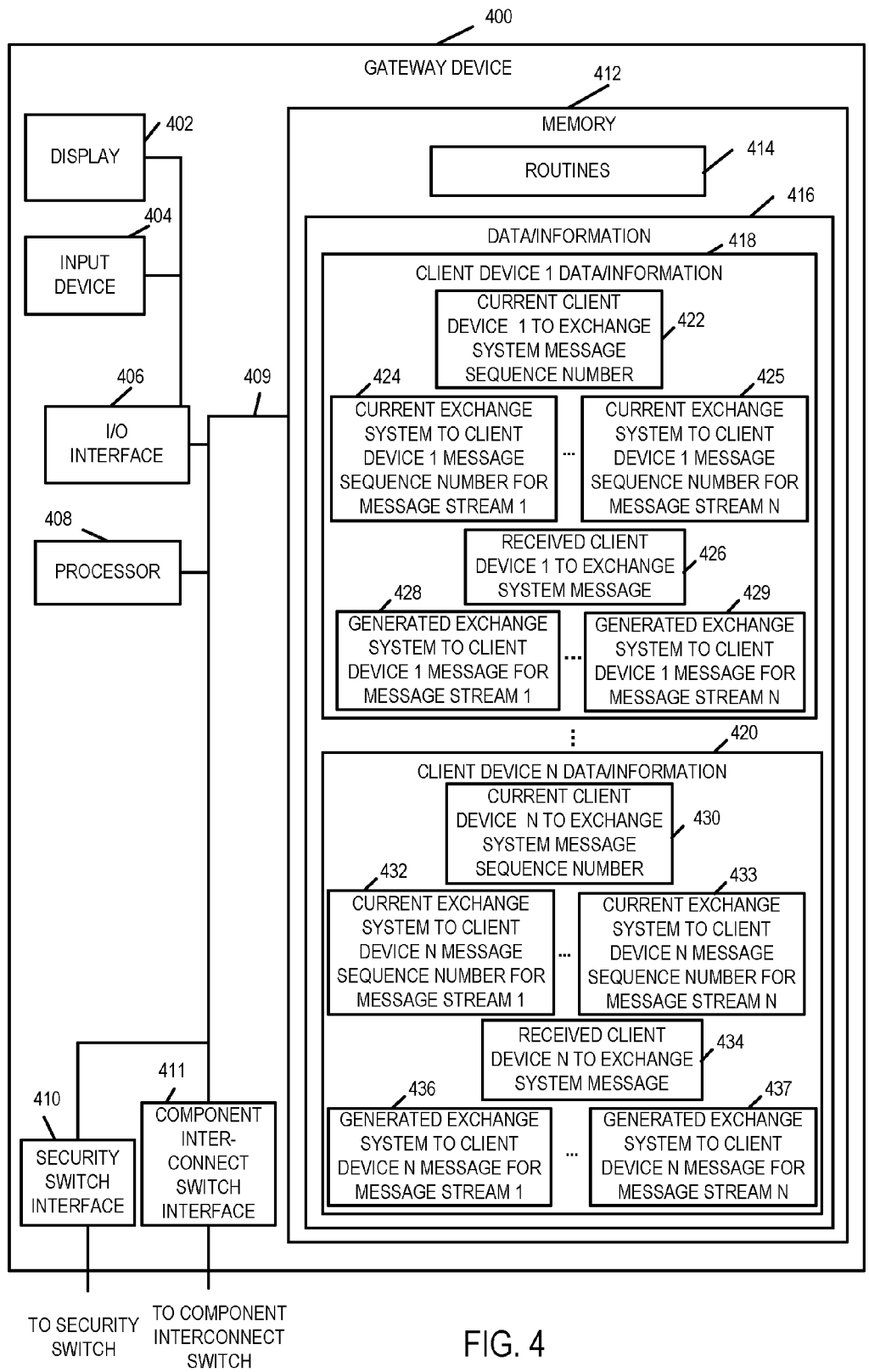
FIG. 4 is a drawing of an exemplary gateway device in accordance with an exemplary embodiment.

FIG. 4 is a drawing of an exemplary gateway device 400 in accordance with an exemplary embodiment. Exemplary gateway device 400 is, e.g., any of the gateway devices (138, . . . , 140, 142, . . . , 144) of exchange system 110 of system 100 of FIG. 1. Exemplary gateway device 400 includes an I/O interface 406, a processor 408, a security switch interface 410, a component interconnect switch interface 411 and a memory 412 coupled together via a bus 409 over which the various elements may interchange data and information. The I/O interface 406 is coupled to a display 402 and an input device 404, e.g., keyboard, keypad, mouse, etc. Memory 412 includes routines 414 and data/information 416. The processor 408, e.g., a CPU, may execute the routines 414 and use the data/information 416 in memory 412 to implement a method, e.g., a method in accordance with flowchart 300 of FIG. 3. Data/information 416 includes client device data/information corresponding to a plurality of client devices (client device 1 data/information 418, . . . , client device N data/information 420). Client device 1 data/information 418 includes a current client device 1 to exchange system message sequence number 422, a plurality of current exchange system to client device 1 message sequence numbers corresponding to different streams (a current exchange system to client device 1 message sequence number for message stream 1 424, . . . , a current exchange system to client device 1 message sequence number for message stream N 425), a received client device 1 to exchange system message 426, and a plurality of generated exchange system to client device 1 messages corresponding to different message streams (a generated exchange system to client device 1 message for message stream 1 428, . . . , a generated exchange system to client device 1 message for message stream N 429). Client device N data/information 420 includes a current client N device to exchange system message sequence number 430, a plurality of current exchange system to client device N message sequence numbers corresponding to different streams (a current exchange system to client device N message sequence number for message stream 1 432, . . . , a current exchange system to client device N message sequence number for message stream N 433), a received client device N to exchange system message 434, and a plurality of generated exchange system to client device N messages corresponding to different message streams (a generated exchange system to client device N message for message stream 1 436, . . . , a generated exchange system to client device N message for message stream N 437). In some embodiments, an exchange system to client device message stream corresponds to a client device, e.g., a trader system, and a matching engine group. The client devices (1, . . . , N) are, e.g., any of the client devices (112, . . . , 114, 116, . . . , 118) which have an ongoing session with the exchange system via gateway 400.

Figure 5:
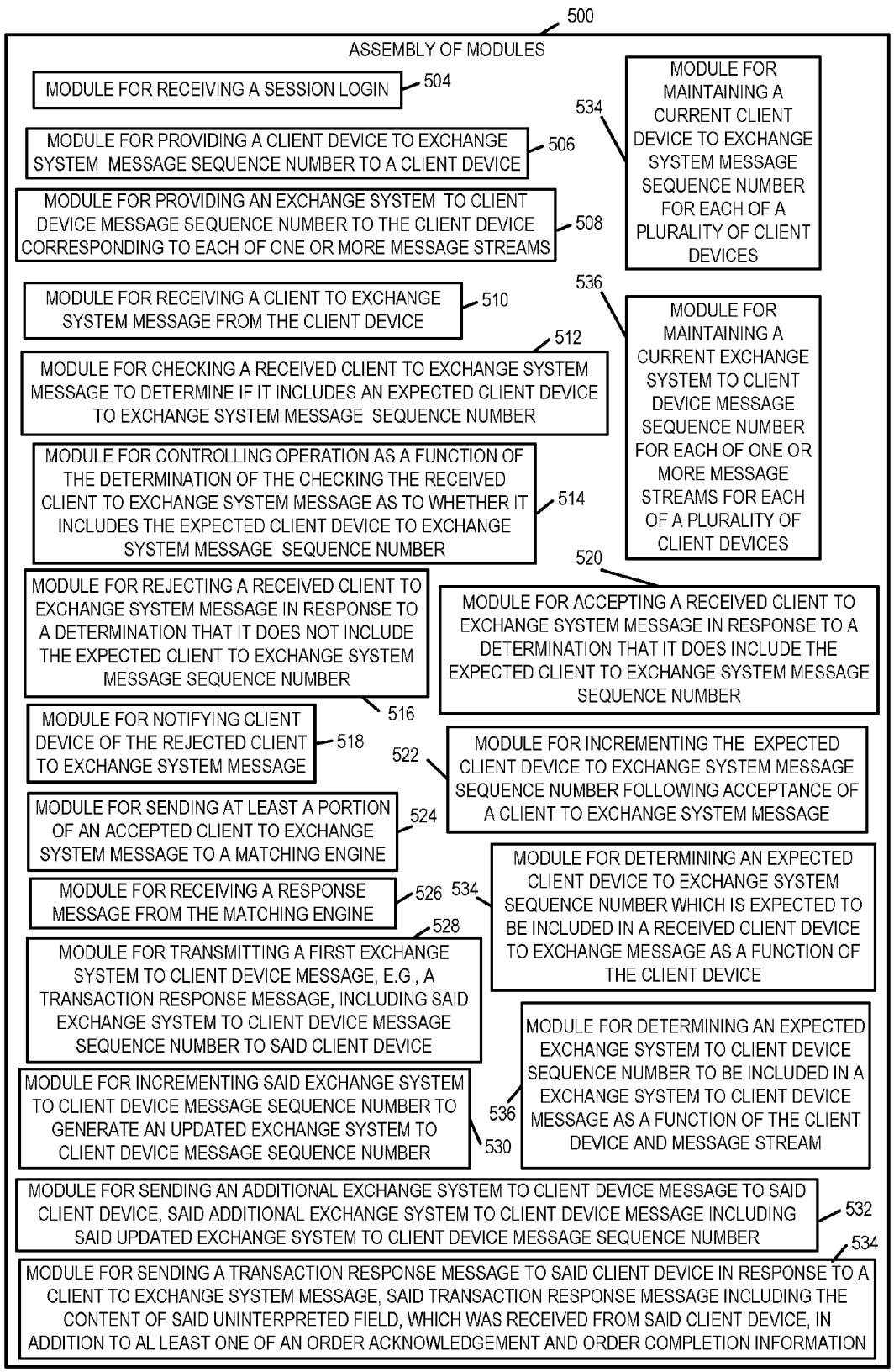
FIG. 5 is a drawing of an exemplary assembly of modules, which may be used in the gateway device of FIG. 4, in accordance with various embodiments.

FIG. 5 is a drawing of an exemplary assembly of modules 500 in accordance with various embodiments. Assembly of modules 500 is, e.g., included in routines 414 of memory 412 of gateway 400 of FIG. 4. Assembly of modules 500 includes a module for receiving a session login 504, a module for providing a client device to exchange system message sequence number to a client device 506, a module for providing an exchange system to client device message sequence number to a client device 508, a module for receiving a client to exchange system message from a client device 510, and a module for checking a received client to exchange system message to determine if it includes an expected client device to exchange system message sequence number 512.

In some embodiments, a received first client to exchange system message includes an uninterpreted field, said uninterpreted field including client device supplied information which is to be returned without alternation to said client device in any response message corresponding to said received client to exchange system message. In some such embodiments, the uninterpreted field includes information used by the client device or a broker to identify or track client to exchange messages and/or to identify the individual upon who's behalf an order is being placed by a trader.

Assembly of modules 500 further includes a module for controlling operation as a function of the determination of the checking of the received client to exchange system message as to whether it includes the expected client device to exchange system message sequence number 514, a module for rejecting a received client to exchange system message in response to a determination that it does not include the expected client device to exchange system message sequence number 516, a module for notifying a client device of the rejected client to exchange system message 518, a module for accepting a received client to exchange system message in response to a determination that it does include the expected client device to exchange system message sequence number 520, and a module for incrementing the expected client device to exchange system message sequence number following acceptance of a client to exchange system message 522. Assembly of modules 500 further includes a module for sending at least a portion of an accepted client to exchange system message to a matching engine 524, a module for receiving a response to a message from a matching engine 526, a module for transmitting a first exchange system to client device message, e.g., a transaction response message, including said exchange system to client device message sequence number to said client device 528, a module for incrementing said exchange system to client device message sequence number to generate an updated exchange system to client device message sequence number 530, and a module for sending an additional exchange system to client device message to said client device, said additional exchange system to client device message including said updated exchange system to client device message sequence number 532. In some embodiments, said transaction response message includes the content of said uninterpreted field, which was received from the client device, in addition to at least one of an order acknowledgment and order completion information.

Assembly of modules 500 further includes a module for maintaining a current client device to exchange system message sequence number for each of a plurality of client devices 534 and a module for maintaining a current exchange system to client device message sequence number for each of a plurality of client devices 536.

Assembly of modules 500 further includes a module for sending a transaction response message to said client device in response to a client to exchange system message, e.g., a first client to exchange system message, said transaction response message including the content of said uninterpreted field, which was received from the client device, in addition to at least one of an order acknowledgment and order completion information 534.

FIGS. 6 and 7 illustrate examples showing an exemplary low latency communications path and an exemplary higher bandwidth communications path between a trader system and a gateway/second device. Communication between the gateway and second device may be performed in a secure manner, e.g., because it occurs within the secure ECN.

Drawing 600 of FIG. 6 illustrates various elements of exemplary system 100 of FIG. 1 including client 1 trader system 1 112 and exchange system 110 including security switch 120, second device 134, e.g., a message logging system 134, first device 138, e.g., a client gateway, and matching engine 146. There is a client 1 dedicated link 602 between trader system 1 112 and security switch 120. There is a shared low latency path 604 which includes a path from the security switch 120 through the client gateway 138 and to the matching engine 146. There is a high bandwidth path 606 between the message logging system 134 and the security switch. Ongoing transaction messages between trading system 112 and matching engine 146, traverse client gateway 138, and are communicated using the shared low latency path 604 and via the client 1 dedicated link 602. Gap fill messages are communicated from the message logging system 134 to trader system 112 using the high bandwidth path 606 and via client 1 dedicated link 602.

Drawing 700 of FIG. 7 illustrates various elements of exemplary system 100 of FIG. 1 including client 1 trader system 1 112, client M trader system 1 116, and exchange system 110 including security switch 120, second device 134, e.g., a message logging system 134, first device 138, e.g., a client gateway, component interconnect switch 126, and matching engine 146. Shared low latency path 702 provides a path from security switch 120 to matching engine 146 via gateway 138 and component interconnect switch 126. Both trader system 112 and trader system 116 use the low latency path 702 to ongoing transaction messages with matching engine 146.

High bandwidth path 704 provides a path from second device, e.g., message logging system 134, to security switch 120, via component switch 126, to be used for communication of gap fill messages to trader system 112. In some embodiments, the high bandwidth path 704 does not traverse the component interconnect switch 126, e.g., the second device 134 connects directly to the security switch. Various control signals (706, 708) communicated between the gateway 138 and the second device 134 are used for gap fill related control operations, e.g., to trigger a gap fill, to specify which message or messages are to be sent, to indicate that the missing message or messages have been sent, and/or to indicate that synchronization has been restored between the client device and the exchange system.

Multiple traders, corresponding to different clients, may communicate with a gateway through which messages are passed for processing. In order to make sure that both a trader and the ECN implementing trades have not lost or dropped messages, message sequence numbers are often used.

Trading sessions may involve thousands of messages, and depending on the size of the discrepancy in the number of messages which the trader system and the gateway are aware of, the number of messages which may need to be communicated, as part of a gap fill before a trading session can proceed, can be significant.

While communication between the trading system and exchange is normally reliable due to the use of TCP/IP for the portion of the connection between the trader system 112, and exchange 110, a communications link may be lost for some reason and/or the trader system may be shut down or lose power. This may result in the trader system not being fully aware of them messages which were sent by the exchange system or the trader system losing, e.g., not storing, some messages which were sent by the exchange to the trading system 112 or from the trading system 112. Thus when the trader system logs in to continue an existing session, the message state in the trader system 112 may not be fully synchronized with the message state in the exchange system 110.

In accordance with the present invention, as will be discussed further below, communication of missing messages between a trader system and a gateway is performed over different communications path than is used for the communication of new messages. The secondary communications path used for message gap fills may, and in various embodiments does, have a higher latency then the communications path used for new messages. The secondary communications path, in some embodiments supports a higher communications data rate with the trader system than the communications path used for new messages. Thus, while the latency, e.g., and thus transmission time of an individual message may take longer over the secondary path, the overall data throughput with the trader system may also be higher on the secondary path. Thus a large number of messages may be able to be communicated over the second communications path in less time than would be required to transmit the same large number of messages over the primary communications path used for new messages.

Once message synchronization has been restored, communication of new messages proceeds over the high speed, e.g., primary, message communications path between the trader system and the gateway of the ECN.

The methods and apparatus of the present invention may be used with communications using FIX or a binary order entry protocol such as, e.g., OUCH or a similar protocol. Thus, the methods and apparatus of the present invention are well suited for many of the trading systems and protocols currently in use.

Figure 8:
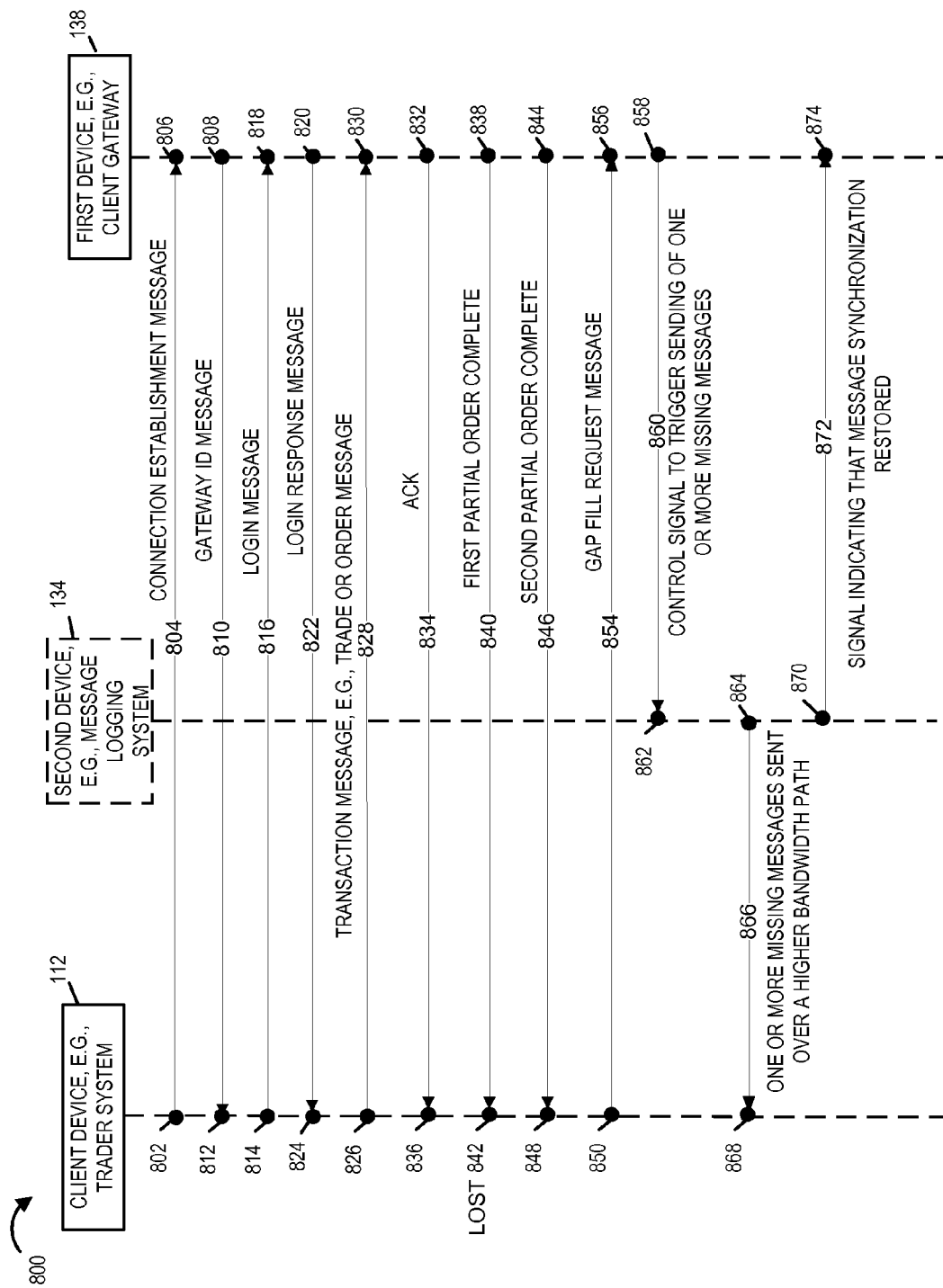
FIG. 8 illustrates the steps and associated signaling used in one exemplary embodiment where it is determined that a device participating in a trading session, e.g., a trader system, is missing one or more session messages.

Having generally discussed the exemplary system implementations shown in FIGS. 1 and 2, an exemplary method will now be discussed in detail with regard to the example shown in FIG. 8. Elements of the system 100 shown in FIG. 1 which participate in the method being explained in the FIG. 8 example are shown at the top of FIG. 8 and bear the same reference numbers as used in FIG. 1. Messages, information, content and/or signals communicated between devices are represented in FIG. 8 using arrows. The exemplary process shown in FIG. 8 will now be described in detail.

At the top of FIG. 8, various elements 800 of the system 100 which may participate in an exemplary method for restoring message synchronization between a trader system and the client gateway in a trading system during a session, e.g., a trading session, are shown. The illustrated components 800 include a client device 112, e.g., a trader system, a second device 134, e.g., a message logging system, and a first device 138, e.g., a client gateway.

FIG. 8, illustrates the steps and associated signaling used in one exemplary embodiment where it is determined whether a device participating in a trading session, e.g., a trader system 112, is missing one or more session messages. As will be discussed below, in accordance with one aspect of the invention when it is determined that a device, i.e., the trader system 112, is missing one or more session messages, the second device 134 is operated to restore the session message synchronization between the trader system 112 and the client gateway 138, before processing trade order(s) from the trader system 112.

The process starts in step 802 where the trader system 112 sends a connection establishment message 804 to the exchange system 110. The connection establishment message 804 is received by the client gateway 138 located at the exchange system 110 in step 806 and processed. In various embodiments the connection establishment message 804 is sent to establish a communications session, e.g., prior to performing a trade, between the trader system 112 and the exchange system 110.

Following the receipt and processing of the connection establishment message 804 at the client gateway 138, in step 808 the client gateway 138 sends a gateway ID message 810 to the trader system 112 in response to the connection establishment message 804. The gateway ID message 810 is received and processed by the trader system 112 in step 812. Next in step 814 the trader system 112 sends a login message 816 to the client gateway 138. In some embodiments the login message 816 is sent from the trader system 112 to the client gateway 138 over a first communications path, e.g., a low latency communications path including path 161, shown in FIGS. 1-2. In accordance with one aspect of some embodiments, both the trader system 112 and the client gateway 138, includes an incoming message counter and an outgoing message counter to keep a track of the number of messages exchanged during a trading session. In some embodiments, there is a client device to exchange system message sequence number for messages from trader system 112 to the client gateway 138 and an exchange system to client device message sequence number for a message stream from the client gateway 138 to trader system 112 corresponding to a matching engine.

The login message 816 is received by the client gateway 138 in step 818 and is processed. In step 820 the client gateway 138 transmits a login response message 822 to the trader system 112. In some embodiments, the login response message 822 communicates a next exchange system to client device message sequence number. In step 824 trader system 112 receives message 822 and recovers the information communicated in login response message 822.

In step 826 the trader system generates and transmits a transaction message 828, e.g., a trade or order message. In step 830 the client gateway 138 receives the transaction message 828 and proceeds to process the trade or order. In step 832 the client gateway 138 transmits an acknowledgment message 834 in response to the transaction message 828. Consider that the acknowledgment message is successfully received by the trader system 112 in step 836. Next, in step 838 the client gateway 138 transmits a first partial order complete message 840 to the trader system 112. Consider that this message is lost in step 836 from the perspective of the trader system 112, which does not successfully receive the first partial order complete message 840.

Next, in step 844 the client gateway 138 transmits a second partial order complete message 846 to the trader system 112. Consider that this message 846 is successfully recovered in step 848 by the trader system 112. However, the trader system 112 determines, e.g., based on an exchange system to client device sequence number included in message 846 and an exchange system to client device sequence number included in message 834, that it has lost a message, e.g., the sequence number in message 846 is higher than expected indicating that a message has been lost or missed. Therefore the trader system 112, in step 850 generates and sends a gap fill request message 854 to client gateway 138. In step 856, the client gateway 138 receives the gap fill request message 854 from the trader system 112 requesting a previous message that was sent to the trader system 112. The client gateway 138 determines from the gap fill request message that the trader system 112 requires one previous message to be provided as part of a gap fill operation. In this example of FIG. 8, trader system 112 lost one message. However, the gap fill may, and sometimes does, apply to multiple messages.

If it is detected that the trader system 112 is missing one or more messages corresponding to a trading session, then in accordance with the invention, the message synchronization is restored via use of secondary, high bandwidth communications path which is different from a low latency communications path over which the connection establishment message was received and/or new trade messages are received and processed, e.g., a high bandwidth path including path 160 in FIGS. 1 and 2.

Note that in step 856 the gateway 138 determines that a message gap fill needs to be performed. In step 858 a control signal 860 is then sent to the second device 134, e.g. a message logging system, from the client gateway 138 to instruct it to proceed with the necessary message gap fill required to restore message synchronization. The message 860 may be sent over a secure communications channel. In step 862 the second device 134 receives control signal 860 which triggers a message gap fill. The one or more missing messages 866 are then communicated from the second device 134, e.g. the message logging system, via the secondary high bandwidth communications path. In step 868 the missing message or messages 866, e.g., information including a copy of missing first partial order message 840, is received and recovered by the trader system 112.

Once the missing message or messages are communicated to the trader system 112 from the second device 134, a control signal 872 is sent in step 870 from the second device 134 to the client gateway 138 informing the client gateway 138 that session synchronization has been restored. The client gateway 138 in step 874 receives signal 872 and recognizes that synchronization has been restored. The gateway device 138 and the trader system 112 then proceed with the trading session via the high speed low latency communications path with new trades and replies occurring over the low latency communications path.

Figure 9:
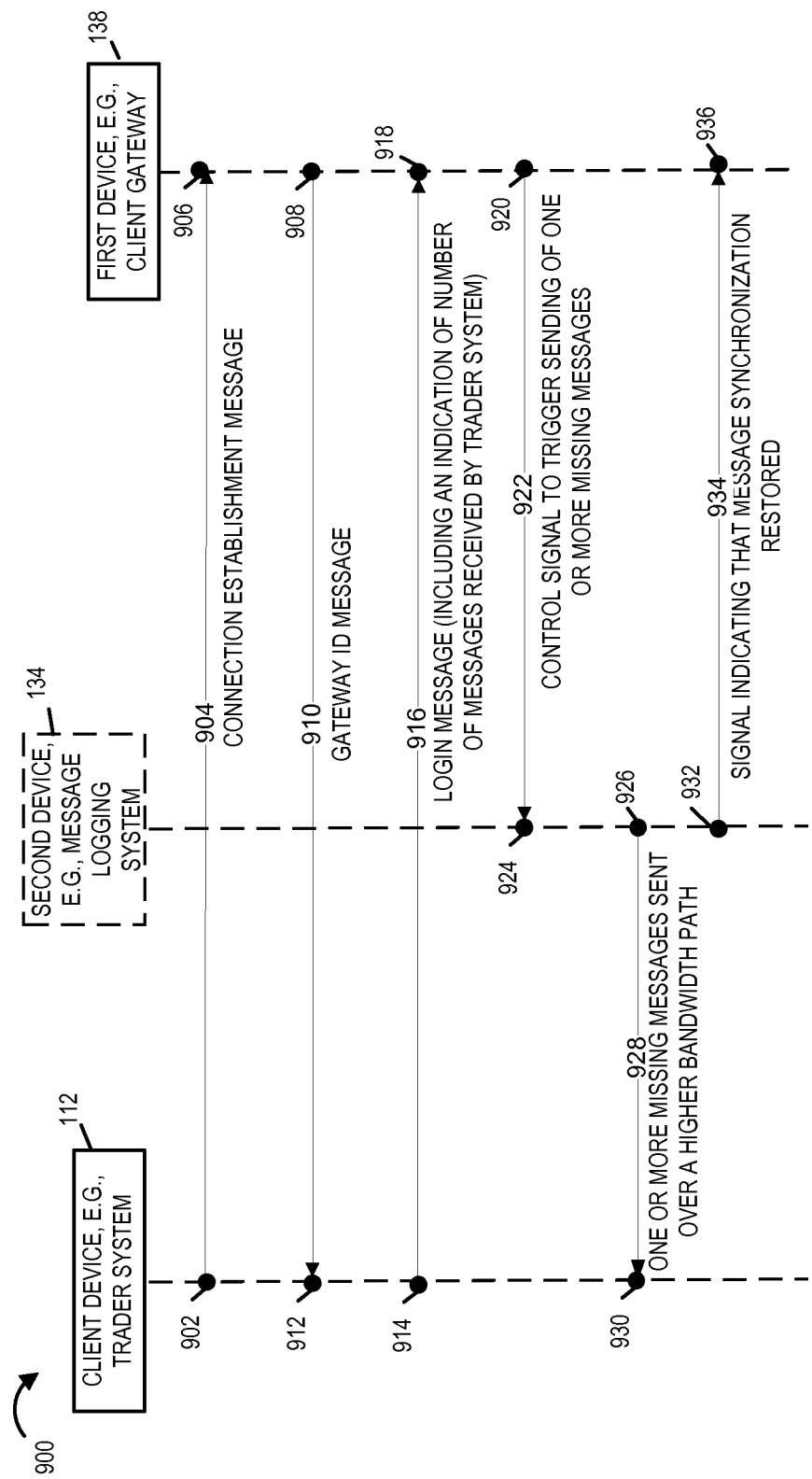
FIG. 9, illustrates the steps and associated signaling used in one exemplary embodiment where it is determined that a device participating in a trading session, e.g., a trader system, is missing one or more session messages.

Elements of the system 100 shown in FIG. 1 which participate in the method being explained in the FIG. 9 example are shown at the top of FIG. 9 and bear the same reference numbers as used in FIG. 1. Messages, information, content and/or signals communicated between devices are represented in FIG. 9 using arrows. The exemplary process shown in FIG. 9 will now be described in detail.

At the top of FIG. 9, various elements 900 of the system 100 which may participate in an exemplary method for restoring message synchronization between a trader system and the client gateway in a trading system during a session, e.g., a trading session, are shown. The illustrated components 900 include a client device 112, e.g., a trader system, a second device 134, e.g., a message logging system, and a first device 138, e.g., a client gateway.

FIG. 9, illustrates the steps and associated signaling used in one exemplary embodiment where it is determined whether a device participating in a trading session, e.g., a trader system 112, is missing one or more session messages. As will be discussed below, in accordance with one aspect of the invention when it is determined that a device, i.e., the trader system 112, is missing one or more session messages, the second device 134 is operated to restore the session message synchronization between the trader system 112 and the client gateway 138, before processing trade order(s) from the trader system 112.

The process starts in step 902 where the trader system 112 sends a connection establishment message 904 to the exchange system 110. The connection establishment message 904 is received by the client gateway 138 located at the exchange system 110 in step 906 and processed. In various embodiments the connection establishment message 904 is sent to establish a communications session, e.g., prior to performing a trade, between the trader system 112 and the exchange system 110.

Following the receipt and processing of the connection establishment message 904 at the client gateway 138, in step 908 the client gateway 138 sends a gateway ID message 910 to the trader system 112 in response to the connection establishment message 904. The gateway ID message 910 is received and processed by the trader system 112 in step 912. Next in step 914 the trader system 112 sends a login message 916 to the client gateway 138. In some embodiments the login message 916 is sent from the trader system 112 to the client gateway 138 over a first communications path, e.g., a low latency communications path including path 161, shown in FIGS. 1-2. In accordance with one aspect of some embodiments, both the trader system 112 and the client gateway 138, includes an incoming message counter and an outgoing message counter to keep a track of the number of messages exchanged during a trading session. In some embodiments, there is a client device to exchange system message sequence number for messages from trader system 112 to the client gateway 138 and an exchange system to client device message sequence number for a message stream from the client gateway 138 to the trader system 112 corresponding to a matching engine.

In step 914, the trader system 112 sends a login message including an indication of the number of messages received by the trader system. In step 918, the client gateway receives login message 916, and determines if a number of received messages indicated in said received login message is less than the number of messages sent to the trader system 112. In this example, the client gateway 138 determines that the number of messages received by the trader system 112 is less than the number or messages sent to the trader system 112. Therefore, the client gateway determines that the trader system 100 requires a message gap fill.

In step 920 the client gateway 138 generates and sends a control signal 922 to the second device 134, e.g., a message logging system, to trigger the second device to supply one or more previously transmitted messages to the trader system 112 via a second communications path in response to the determination that the trader system requires a message gap fill. The second communications path is a high bandwidth path, e.g., a path including path 160 in FIG. 1. The message 922 may be sent over a secure communications channel. Control signal 922 is received by second device 134 in step 924.

In step 926, in response to signal 922, second device 134 sends the one or more missing messages 928 via the secondary high bandwidth communications path. In step 930 the missing message or messages 928 are received and recovered by the trader system 112.

Once the missing message or messages are communicated to the trader system 112 from the second device 134, a control signal 934 is sent in step 932 from the second device 134 to the client gateway 138 informing the client gateway 138 that session synchronization has been restored. The client gateway 138 in step 936 receives signal 934 and recognizes that synchronization has been restored. The gateway device 138 and the trader system 112 then proceed with the trading session via the high speed low latency communications path with new trades and replies occurring over the low latency communications path.

Figure 10:
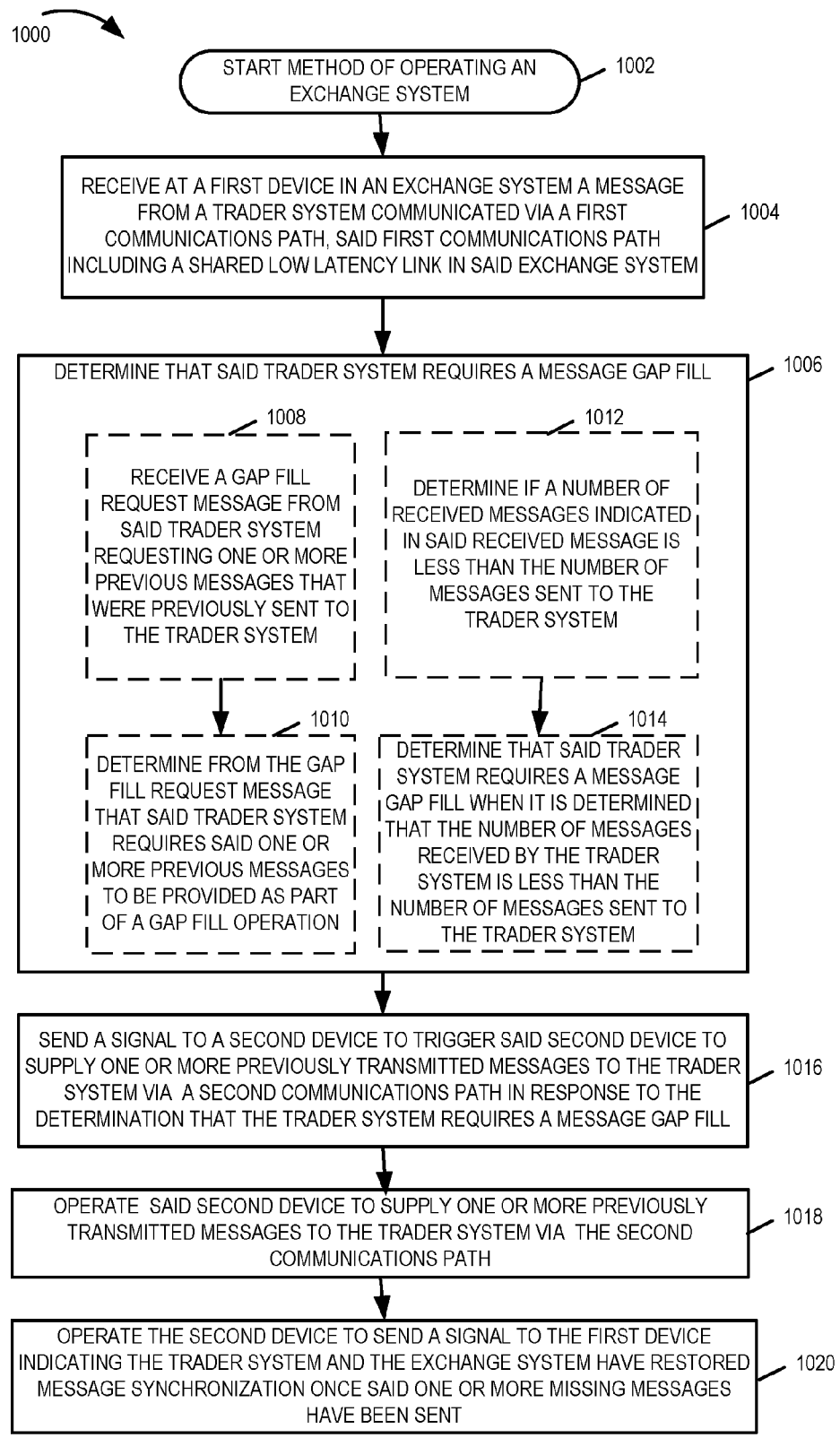
FIG. 10 is a flowchart of an exemplary method of operating an exchange system in accordance with an exemplary embodiment.

FIG. 10 is a flowchart 1000 of an exemplary method of operating an exchange system in accordance with various embodiments. Operation starts in step 1002 where the exchange system is powered on and initialized. Operation proceeds from start step 1002 to step 1004. In step 1004 a first device, e.g., a gateway device, in the exchange system receives a message, e.g., a transaction message or a login message, from a trader system communicated via a first communications path. In some embodiments, the transaction message is a message including an indication of the number of messages already received by the trader system as part of a trading session. The first communications path includes a shared low latency link in the exchange system. In some embodiments, the shared low latency link is a link between a security switch and a gateway device which is shared by multiple trader systems. Operation proceeds from step 1004 to step 1006.

In step 1006 the exchange system determines that the trader system requires a message gap fill. In some embodiments, step 1006 includes step 1008 and step 1010. In some other embodiments, step 1006 includes step 1012 and 1014. In still other embodiments, step 1006 includes steps 1008, 1010, 1012 and 1014.

In step 1008 the exchange system receives a gap fill request message from said trader system requesting one or more previous messages that were previously sent to the trader system. In some embodiments, the gap fill request message includes one or more stream identifiers, each stream identifier identifying an exchange to trader message stream for which at least one message is being requested. In some such embodiments, the gap fill request message includes multiple stream identifiers, and each of the multiple stream identifiers corresponds to a different matching engine group from which a message was sent to the trader system. Operation proceeds from step 1008 to step 1010. In step 1010 the trader system determines from the gap fill request message that the trader system requires one or more previous messages to be provided as part of a gap fill operation.

In step 1012 the exchange system determines if a number of received messages indicated in said received message, e.g., a received login message received in step 1004, is less than the number of messages sent to the trader system. Operation proceeds from step 1012 to step 1014. In step 1014 the exchange system determines that said trader system requires a message gap fill when it is determined that the number of messages received by the trader system is less than the number of messages sent to the trader system.

Operation proceeds from step 1006 to step 1016. In step 1016 the exchange system sends a signal to a second device, e.g., a message logging system in the exchange system, to trigger said second device to supply one or more previously transmitted messages to the trader system via a second communications path in response to a determination that the trader system requires a message gap fill. In some embodiments, the second device is a message logging device including stored messages corresponding to the trading session. Operation proceeds from step 1016 to step 1018. In step 1018 the second device is operated to supply one or more previously transmitted messages to the trader system via the second communications path. Operation proceeds from step 1018 to step 1020. In step 1020 the second device is operated to send a signal to the first device indicating that that the trader system and the exchange system have restored message synchronization once the one or more messages have been sent.

In various embodiments, the first communications path has a lower latency than the second communications path. In some embodiments, the first communications path is a communications path used for placing orders and communicating order acknowledgements. In various embodiments, the second communications path supports a higher bandwidth with said exchange system for communications with said trader system than the first communications path which includes said shared low latency link.

In various embodiments, a portion of said first and second communications paths between the trader system and the exchange system are the same, said portion not being shared with other traders. In some embodiments, the second communications path is used for message gap fills and has a higher end to end latency between the trader system and the second device than the first communications path has between the trader system and a matching engine.

In some embodiments, the first device is a client gateway device and the exchange system is an electronic communications network which implements electronic trades.

In some embodiments, the first communications path includes a first link and second communications path includes a second link, and said first and second links are physically different links. In various embodiments, said lower latency over the first communications path is achieved by limiting the amount of data corresponding to an individual client device that can be sent over the link in a continuous burst to an amount which is less than the amount of data corresponding to an individual client device that can be send in a single burst over said second communications link. In some embodiments, said first and second links are the same type of physical links, e.g., both links are wired links.

Figure 11:
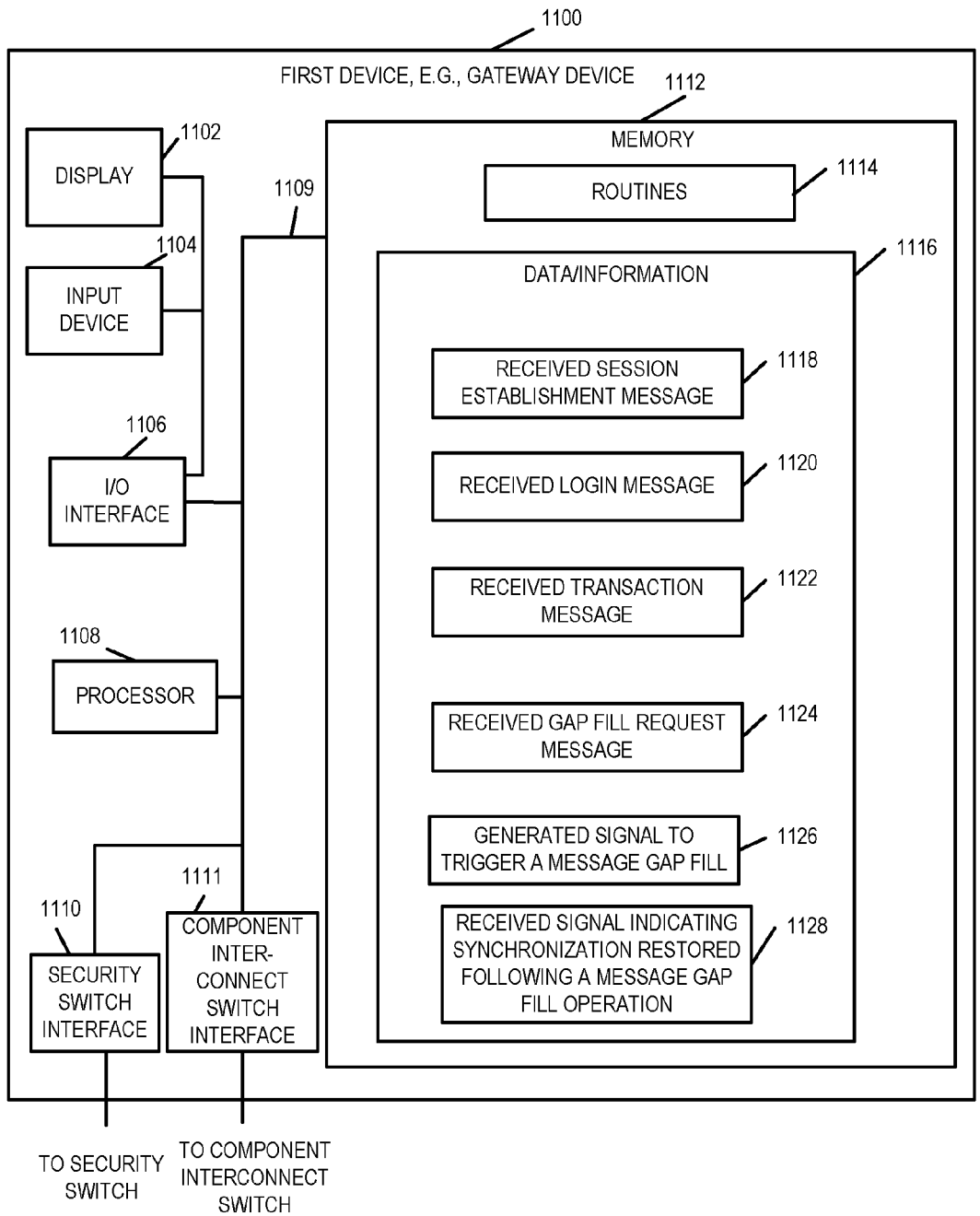
FIG. 11 is a drawing of an exemplary first device, e.g., a gateway device, in accordance with an exemplary embodiment.

FIG. 11 is a drawing of an exemplary first device 1100, e.g., a gateway device, in accordance with an exemplary embodiment. Exemplary first device 1100 is, e.g., any of the gateway devices (138, . . . , 140, 142, . . . , 144) of exchange system 110 of system 100 of FIG. 1. Exemplary first device 1100 includes an I/O interface 1106, a processor 1108, a security switch interface 1110, a component interconnect switch interface 1111 and a memory 1112 coupled together via a bus 1109 over which the various elements may interchange data and information. The I/O interface 1106 is coupled to a display 1102 and an input device 1104, e.g., keyboard, keypad, mouse, etc. Memory 1112 includes routines 1114 and data/information 1116. The processor 1108, e.g., a CPU, may execute the routines 1114 and use the data/information 1116 in memory 1112 to implement a method, e.g., steps of method performed by a first device in accordance with flowchart 1000 of FIG. 10. Data/information 1116 includes a received session establishment message 1118, a received login message 1120, a received transaction message 1122, a received gap fill request message 1124, a generated signal to trigger a message gap fill 1126, and a received signal indicating synchronization has been restored between a trader system and the exchange system for a session following completion of message gap fill operations by the second device 1128.

Figure 12:
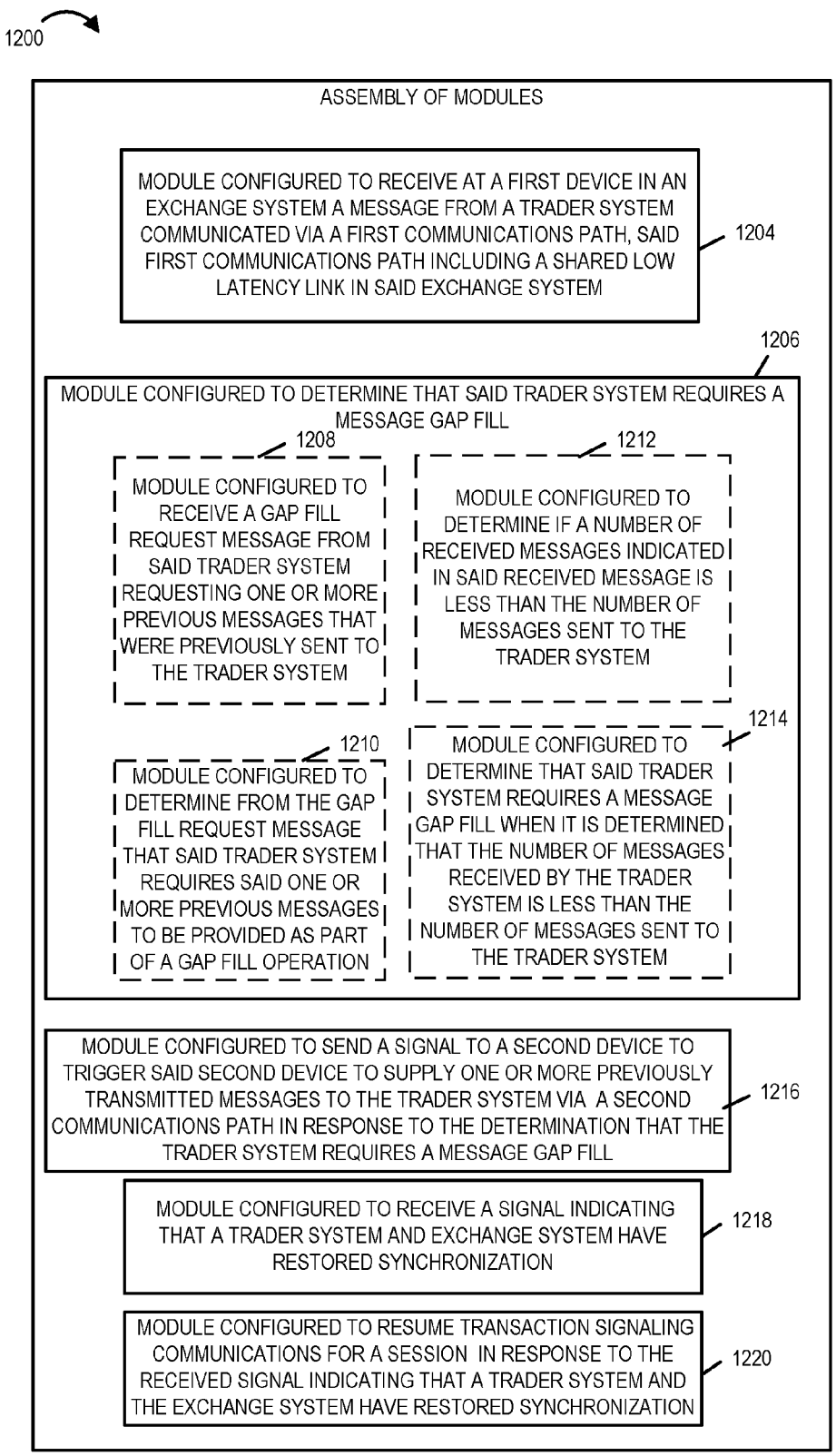
FIG. 12 is a drawing of an exemplary assembly of modules that may be used in the first device of FIG. 11.

FIG. 12 is a drawing of an exemplary assembly of modules 1200 in accordance with various embodiments. Assembly of modules 1200 is, e.g., included in routines 1114 of memory 1112 of first device 1110, e.g. gateway device, of FIG. 11. Assembly of modules 1200 includes a module configured to receive at a first device in an exchange system a message from a trader system communicated via a first communications path, said first communications path including a shared low latency link in said exchange system 1204, a module configured to determine that said trader system requires a message gap fill 1206, a module configured to send a signal to a second device to trigger the second device to supply one or more previously transmitted messages to the trader system via a second communications path in response to determining that the trader system requires a message gap fill 1216, a module configured to receive a signal indicating that a trader system and exchange system have restored synchronization 1218 and a module configured to resume transaction signaling communications for a session in response to the received signal indicating that a trader system and the exchange system have restored synchronization 1220.

In some embodiments, module 1206 includes a module configured to receive a gap fill request message from said trader system requesting one or more previous messages that were previously sent to the trader system 1208 and a module configured to determine from the gap fill request message that the trader system requires said one or more previous messages to be provided as part of a gap fill operation 1210. In other embodiments, module 1206 includes a module configured to determine a number of received messages indicated in said received message is less than the number of messages sent to the trader system 1212 and a module configured to determine that said trader system requires a message gap fill when it is determined that the number of messages received by the trader system is less than the number of messages sent to the trader system 1214. In still other embodiments, module 1206 includes module 1208, 1210, 1212 and 1214.

In some embodiments, the first communications path includes a first link and second communications path includes a second link, and said first and second links are physically different links. In various embodiments, said lower latency over the first communications path is achieved by limiting the amount of data corresponding to an individual client device that can be sent over the link in a continuous burst to an amount which is less than the amount of data corresponding to an individual client device that can be send in a single burst over said second communications link. In some embodiments, said first and second links are the same type of physical links, e.g., both links are wired links.

Figure 13:
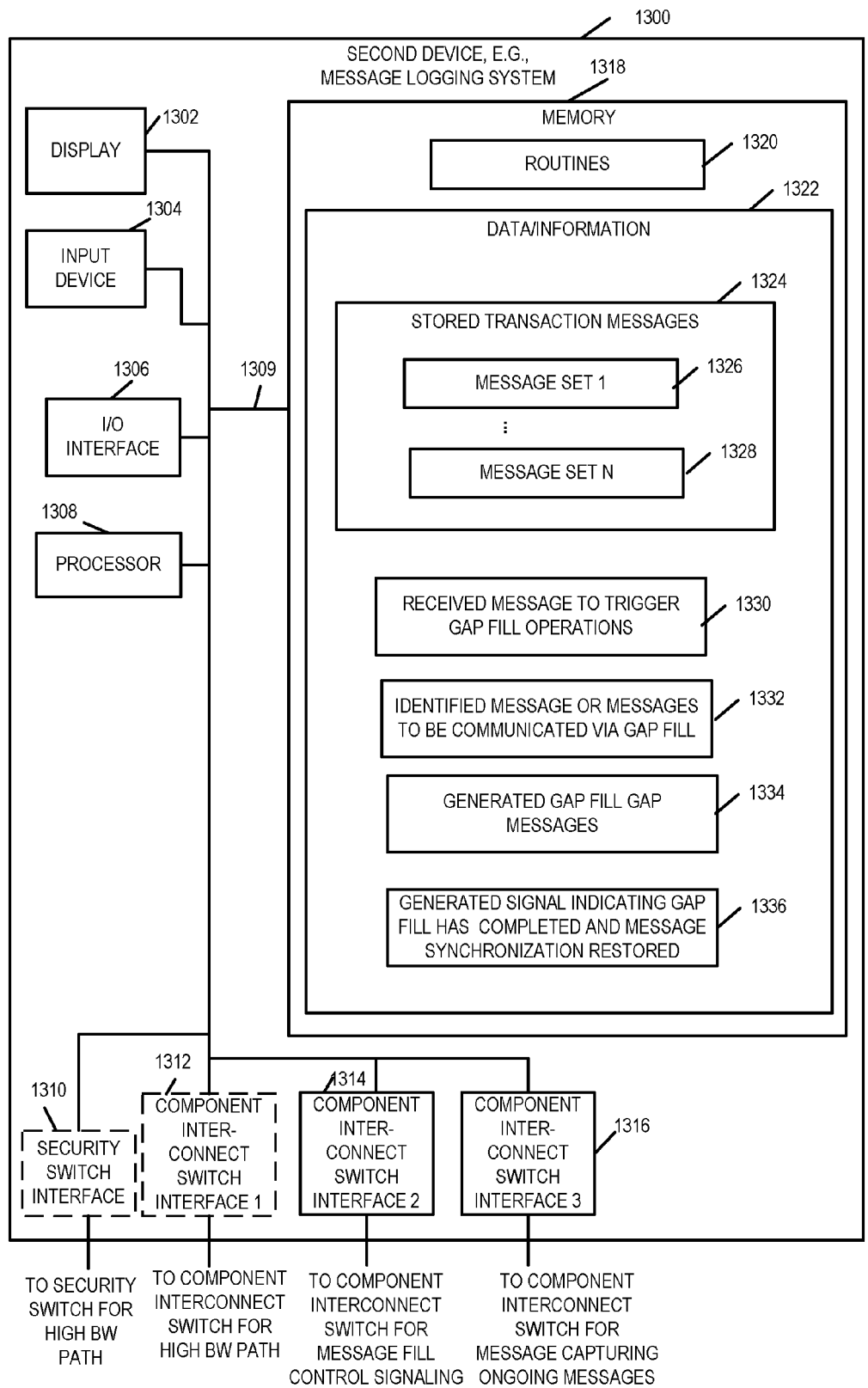
FIG. 13 is a drawing of an exemplary second device, e.g., a message logging system, in accordance with an exemplary embodiment.

FIG. 13 is a drawing of an exemplary second device 1300, e.g., message logging system, in accordance with an exemplary embodiment. Exemplary second device 1300 is, e.g., message logging system 134 of exchange system 110 of system 100 of FIG. 1. Exemplary second device 1300 includes an I/O interface 1306, a processor 1308, a security switch interface 1310, a component interconnect switch interface 1 1312, a component interconnect switch interface 2 1314, a component interconnect switch interface 3 1316 and a memory 1318 coupled together via a bus 1309 over which the various elements may interchange data and information. The I/O interface 1306 is coupled to a display 1302 and an input device 1304, e.g., keyboard, keypad, mouse, etc. Memory 1318 includes routines 1320 and data/information 1322. In some embodiments, the gap fill messages are communicated via the component interconnect switch and interface 1312 is used for the high bandwidth path. In some embodiments, the gap fill messages are communicated to the security switch without traversing the component interconnect switch and interface 1310 is used for communicating the gap fill messages over the high bandwidth path. Interface 1314 is used for communicating message fill control signaling. Interface 1316 is used for capturing ongoing messages in the exchange system, e.g., transaction messages which are captured and stored and are available at a later point in time to be used in gap fill operations.

The processor 1308, e.g., a CPU, may execute the routines 1320 and use the data/information 1322 in memory 1318 to implement a method, e.g., steps of the method performed by a second device in accordance with flowchart 1000 of FIG. 10. Data/information 1322 includes stored transaction messages 1324, a received message to trigger gap fill operations 1330, an identified message or messages to be communicated via gap fill 1332, generated gap fill messages 1334, and a generated signal to indicate that gap fill is completed and message synchronization has been restored 1336.

Figure 14:
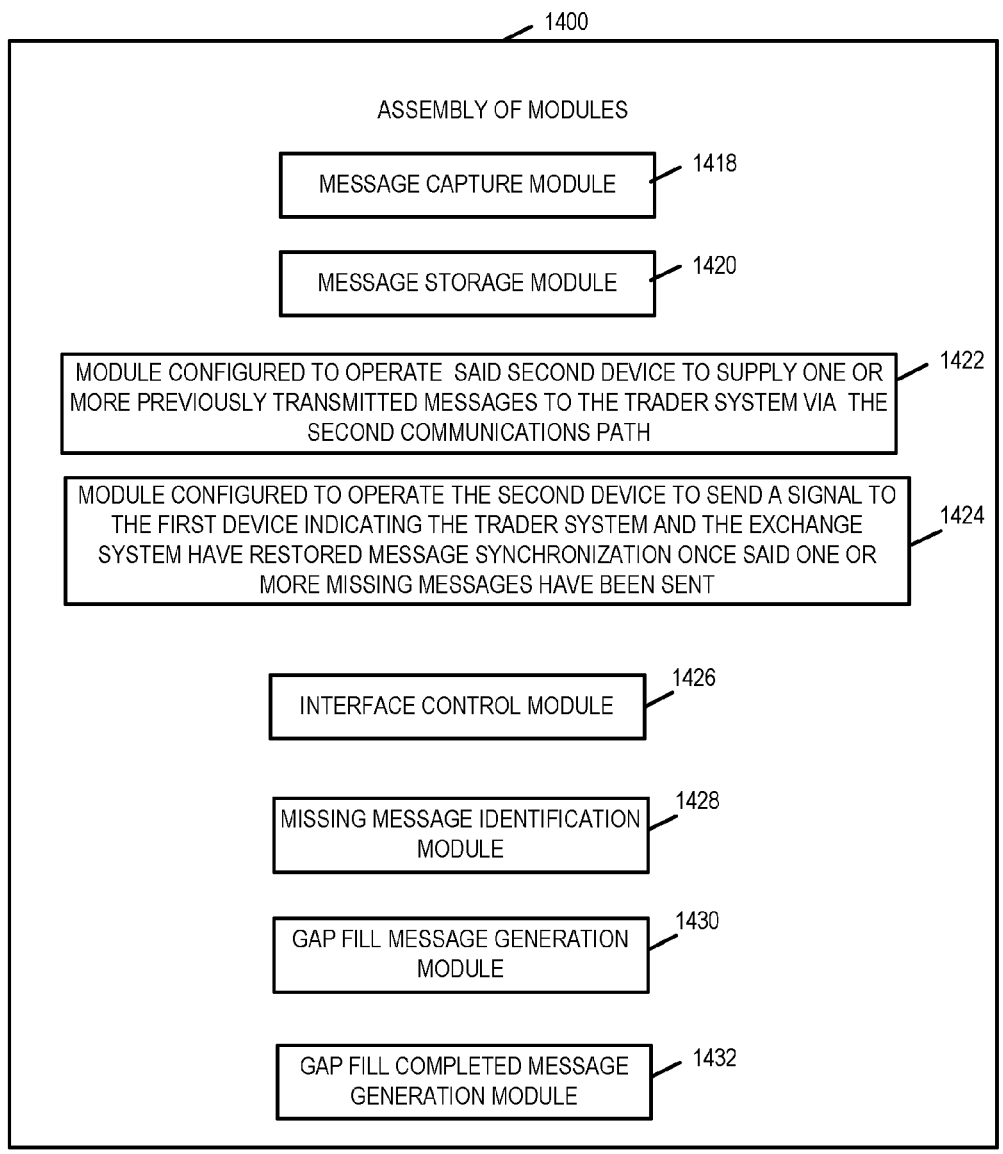
FIG. 14 is a drawing of an exemplary assembly of modules that may be used in the second device of FIG. 13 in accordance with an exemplary embodiment.

FIG. 14 is a drawing of an exemplary assembly of modules 1400 in accordance with various embodiments. Assembly of modules 1400 is, e.g., included in routines 1320 of memory 1318 of second device 1300, e.g. a message logging system, of FIG. 13. Assembly of modules 1400 includes a message capture module 1418 configured to capture ongoing messages in the exchange system including transaction messages, and a message storage module 1420 configured to store messages captured by message capture module 1420. Stored transaction messages 1324 includes messages captured my module 1418 and stored by module 1420. Stored transaction messages 1324 include a plurality of sets of messages (message set 1 1326, . . . , message set N 1328). In some embodiments, a message set corresponds to a message stream from a particular matching engine being sent to a particular trader system.

Assembly of modules 1400 further includes a module configured to operate the second device to supply one or more previously transmitted messages to a trader system via the second communications path 1422, a module configured to operate the second device to send a signal to the first device indicating that the trader system and the exchange system have been restored to message synchronization once said one or more missing messages have been sent 1424. Assembly of modules 1400 further includes an interface control module 1426 configured to control operations of the various interfaces (1310, 1312, 1314, 1316), a missing message identification module 1428 configured to identify which stored messages should be supplied as part of a requested gap fill operation, a gap fill message generation module 1430 configured to generate gap fill messages including the identified missing messages, and a gap fill completed message generation module 1432 configured to generate a message indicating that the requested gap fill operation has been completed and that synchronization has been restored.

Figure 15:
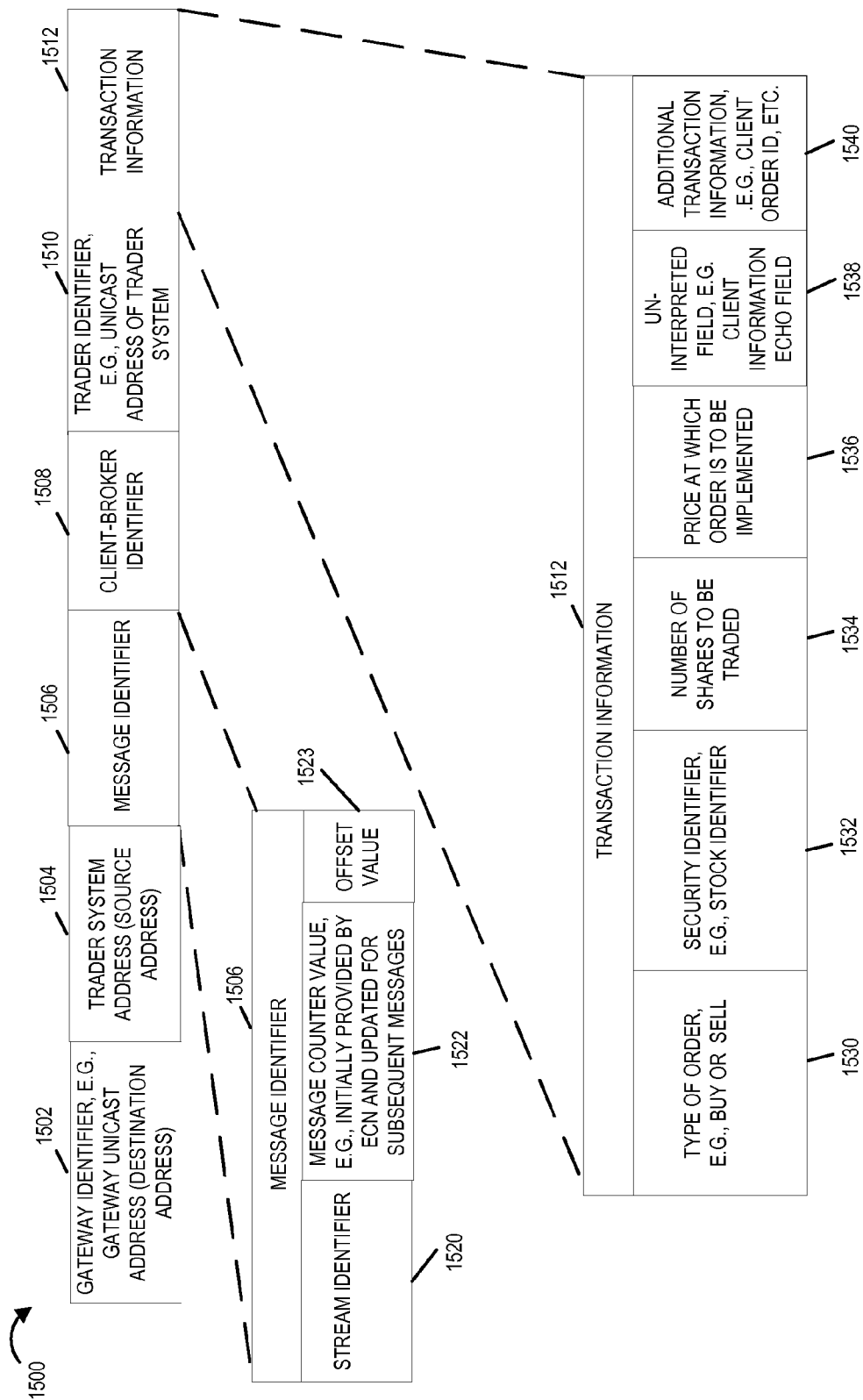
FIG. 15 illustrates an exemplary unicast transaction message, e.g., communicated from a trader system to a gateway device, in accordance with an exemplary embodiment.

An exemplary unicast transaction message 1500 from a trader system, e.g., trader system 100 is shown is FIG. 15. As shown the unicast transaction message 1500 may include various information such as a gateway identifier 1502, e.g., a gateway unicast address which identifies the particular gateway, e.g., gateway 138, which is the intended destination of message 1500. Unicast transaction message 1500 also includes a trader system address 1504 which is the source address of message 1500, e.g., an address of trader system 112.

In addition to the source and destination information, the unicast transaction message 1500 also includes a message identifier 1506. The message identifier 1506 can be used to identify the message and distinguish it from other unicast transaction messages in the system. In some but not necessarily all embodiments, the unicast message identifier 1506 includes a stream identifier portion 1520 and a message counter value 1522. The message identifier 1506 may also include, optionally, an offset value 1523 indicating the offset added to the counter value of the last transaction message sent in the identified stream. The offset value allows incrementing of the counter value by more than one or some non-uniform amount while still allowing a receiving device to accurately generate an expected message counter value from the last message in the identified stream by adding the offset value to the counter value included in the last received transaction message obtained from the identified stream. This allows a receiving device to determine if it is missing any messages whether the message counter value is incremented by the same or different amounts from one message to the next.

In combination the elements of the message identifier field 1506 can identify the unicast message to the trader system, gateway, as well as other devices in the system such a message logging system 134. The stream identifier 1520 may identify the stream within the system to which the message identifier corresponds. Streams corresponding to different source and destination devices may be treated as different streams. In some embodiments, streams are defined to the level of an individual stream, with an individual stream being between a particular trader system and the particular ME to which an order may be forwarded. Thus, transaction messages from a trader corresponding to different stocks which are handled by different MEs may be treated as different streams. Transaction response message streams may also be defined to a similar level with response messages from different MEs to a trader being treated, at least in some embodiments, as different ME to trader streams. For each stream a different message counter may be maintained. During a session messages corresponding to a stream will normally have their message counter values updated with the sending of each new message. In some embodiments, the message counter value is initially provided by the exchange system, e.g., an ECN, and updated for subsequent messages. Thus, the message identifier 1506 can be used to reliably identify a particular message in the exchange system. A device seeking a message gap fill may indicate the messages it wants provided by providing a range of message identifiers. In some embodiments, the gap fill request message includes a stream identifier and a range of corresponding message counter values which in combination identify a set of messages to be provided in response to the gap fill message.

Referring once again to message 1500, the unicast transaction message 1500 may also include a client-broker identifier 1508 and/or a trader identifier 1510. The client-broker identifier 1508 identifies the client and/or broker to which the transaction message 1500 corresponds. Separate values may be used as a client identifier and a broker identify or a single value with a known mapping to a client and broker may be included in the client-broker identifier field. Message 1500 may include various types of transaction information 1512. The transaction information 1512 may include, e.g., order type information 1530 indicating the type of order the transaction message is communicating, a security identifier 1532 identifying a security to which the order relates, a number 1534 of shares to be traded, price information 1536 indicating the price, e.g., on a per share basis, at which the order is to be implemented, un-interpreted field information 1538, e.g., client information echo field information 1638, and/or additional transaction information 1540 such as a client order identifier sometimes referred to as an order token which may be used to identify the order and may be included in response messages corresponding to the order.

Figure 16:
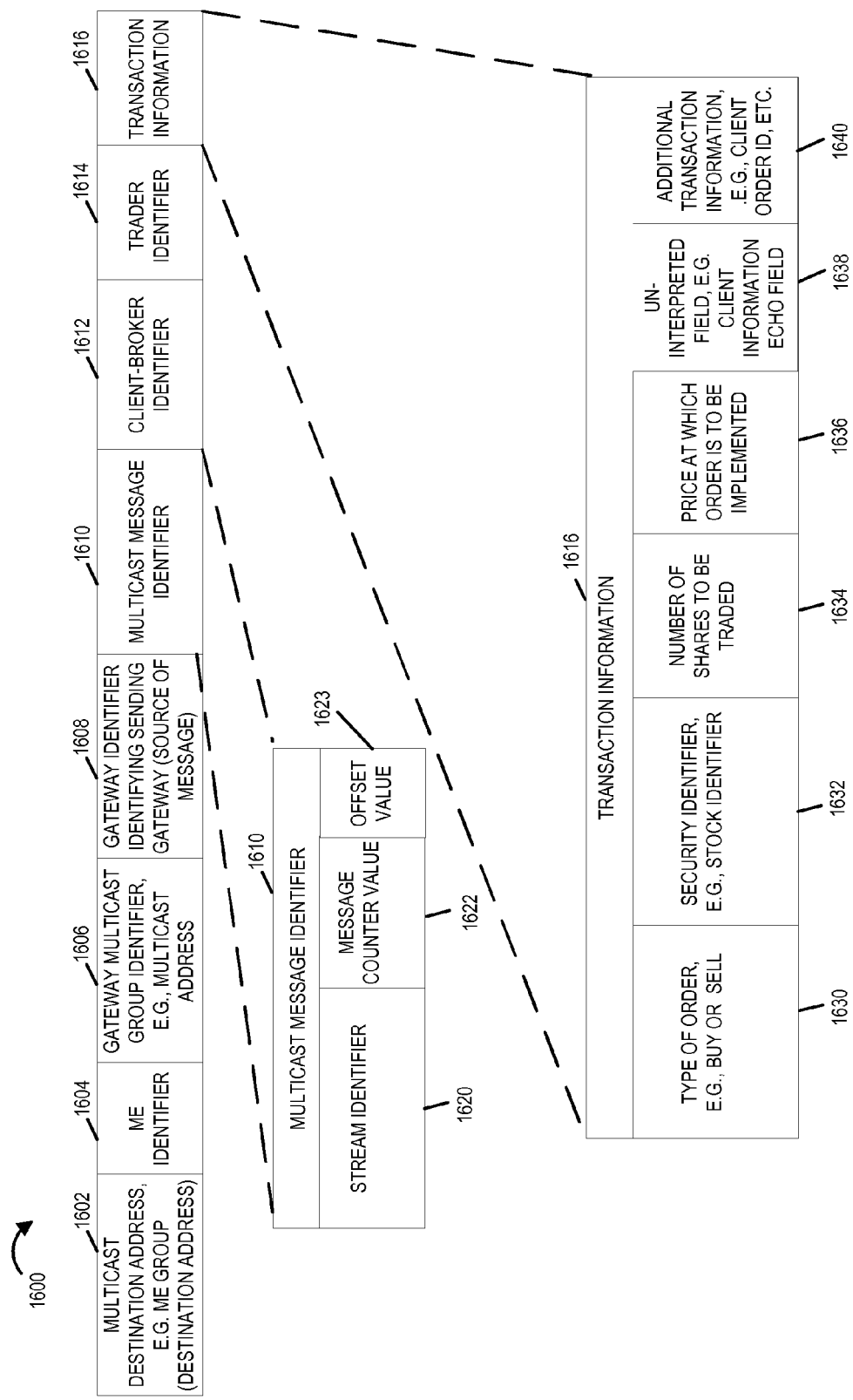
FIG. 16 illustrates an exemplary multicast transaction message, e.g., communicated within an exchange system, in accordance with an exemplary embodiment.

An exemplary multicast transaction message 1600 which may be generated from a received transaction message, e.g., a unicast transaction message, e.g., message 1500, from a trader system 112, is shown in FIG. 16. As shown the multicast transaction message 1600 may include various information such as a multicast address 1602 which is used as a message destination address. The multicast destination address corresponds to a group of matching engines where one of matching engines in the group is known to be responsible for handling the order book for a security, identified in the received transaction message. The multicast transaction message 1600 also includes a matching engine identifier 1604 identifying the specific matching engine responsible handling the transaction requested in the transaction message, e.g., a matching engine which handles the order book for the identified security to be traded. Thus, while a multicast address is used as the destination address of the message 1600 the message includes information identifying a specific matching engine entity to which the message is intended to be delivered to. Based on the ME identifier 1604, a receiving matching engine is able to determine whether or not it is to process and/or respond to the message addressed to the matching engine group identified by the address in field 1602.

The multicast transaction message 1600 also includes a gateway multicast group identifier 1606 corresponding to a multicast group to which the sending gateway belongs. The multicast group identifier 1606 may be, e.g., a multicast group address corresponding to a gateway group. In addition to the gateway multicast group identifier 1606, the message 1600 includes a gateway identifier 1608 identifying the particular gateway, e.g., gateway 138, sending the specific multicast transaction message. Thus, while the message 1600 includes multicast group addresses corresponding to gateway and matching engine groups, it also includes information identifying the specific sending gateway entity and specific destination matching engine. Thus, while multicast addressing is used, the message includes sufficient information to identify a specific sending gateway, e.g., gateway 138 and a specific destination matching engine, e.g., ME 146.

In addition to the source and destination information, the multicast transaction message 1600 also includes a multicast message identifier 1610. The multicast message identifier 1610 can be used to identify the message and distinguish it from other multicast transaction messages in the system. In one but not necessarily all embodiments, the multicast message identifier 1610 includes a stream identifier portion 1620 and a message counter value 1622. In combination these elements can identify the multicast message to the gateway, ME as well as other devices in the system such a message logging system 134. The message identifier 1610 may also include, optionally, an offset value indicating the offset 1623 indicating the offset added to the counter value of the last multicast transaction message sent in the identified stream. The offset value allows incrementing of the counter value by more than one or some non-uniform amount while still allowing a receiving device to accurately generate an expected message counter value from the last message in the identified stream by adding the offset value to the counter value included in the last received transaction message obtained from the identified stream. This allows a receiving device to determine if it is missing one or more previous messages corresponding to the identified stream whether the message counter value is incremented by the same or different amounts from one message to the next. The multicast message counter value 1622 may be the same as the unicast message counter value of the message to which it corresponds. However, in cases where multicast messages are incremented differently from unicast messages they may be different. Also, in some embodiments, NULL multicast transaction messages may be transmitted e.g., by the gateway devices in the exchange on a periodic or other basis to facilitate the rapid detection of the failure of a device to receive a communicated multicast message. In the case of a NULL multicast transaction message generated by a exchange system component, e.g., in response to a recurring timer expiring, the message counter value 1622 will not correspond to a unicast transaction message but will still be higher than the last generated unicast transaction message for the stream identified in the message 1600.

Where unicast transaction messages are incremented by an amount greater than 1, e.g., 2, NULL multicast transaction messages may, and in some embodiments are, generated by incrementing the last received unicast transaction message value by a value less than that used to increment the unicast transaction messages. The NULL transaction messages which do not include any transaction information facilitate the detection, at a receiving device, of a failure to receive a previously transmitted message and are useful as a fault detection mechanism in the exchange system. NULL transaction messages, and corresponding NULL response messages, are not transmitted outside the exchange system, e.g., to a trader system in various embodiments in which they are used.

The stream identifier 1620 may identify the stream within the system to which the multicast message identifier corresponds. Streams corresponding to different source and destination devices may be treated as different streams. In some embodiments, streams are defined to the level of an individual stream, with an individual stream being between a particular trader system and the particular ME to which an order may be forwarded. Thus, transaction messages form a trader corresponding to different stocks which are handled by different MEs may be treated as different streams. Transaction response message streams may also be defined to a similar level with response messages from different MEs to a trader being treated, at least in some embodiments, as different ME to trader streams. For each stream a different message counter may be maintained. During a session messages corresponding to a stream will normally have their message counter values updated with the sending of each new message. Thus, the multicast message identifier 1610 can be used to reliably identify a particular message in the exchange system. A device seeking a message gap fill may indicate the messages it wants by providing a range of multicast message identifiers. In some embodiments, the gap fill request message includes a stream identifier and a range of corresponding message counter values which in combination identify a set of messages to be provided in response to the gap fill message.

Referring once again to message 1600, the multicast transaction message 1600 may also include a client-broker identifier 1612 and/or a trader identifier 1614. The client-broker identifier 1612 identifies the client and/or broker to which the transaction message 1600 corresponds. This information may be obtained from a received unicast transaction message, e.g., message 1500, from which the multicast transaction message 1600 is generated. Similarly the message 1600 may include various types of transaction information 1616. The transaction information 1616 may include, e.g., order type information 1630 indicating the type of order the transaction message is communicating, a security identifier 1632 identifying a security to which the order relates, a number 1634 of shares to be traded, price information 1636 indicating the price, e.g., on a per share basis, at which the order is to be implemented, un-interpreted field information 1638, e.g., client information echo field information 1638, and/or additional transaction information 1640 such as a client order identifier sometimes referred to as an order token which may be used to identify the order and may be included in response messages corresponding to the order.

Figure 17:
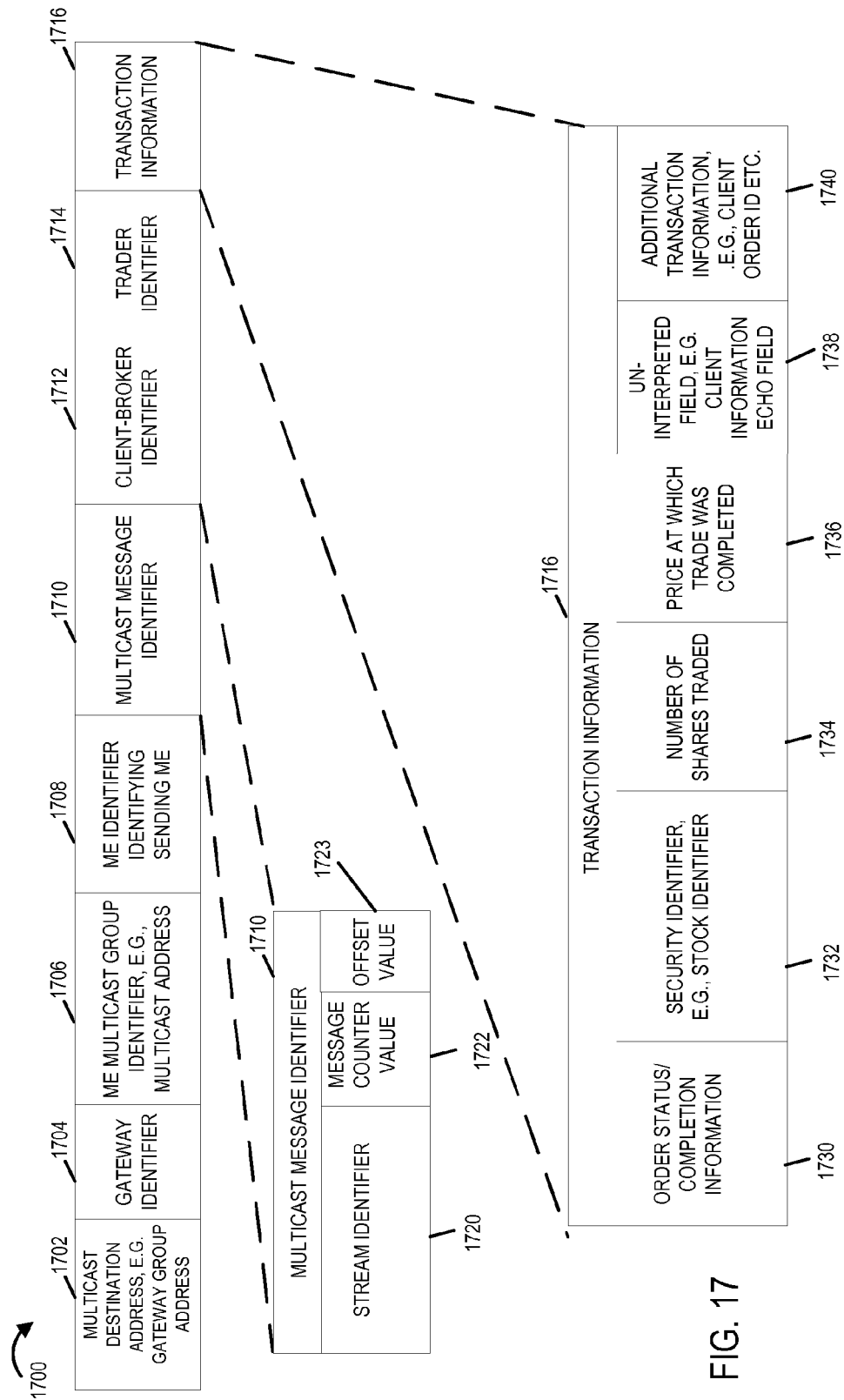
FIG. 17 illustrates an exemplary multicast transaction response message, e.g., communicated within an exchange system, in accordance with an exemplary embodiment.

FIG. 17 illustrates an exemplary multicast transaction response message 1700. The exemplary multicast transaction response message 1700 is similar in content and format to the multicast transaction message 1600 which is already been described. The multicast transaction response message 1700 may, and in some embodiments is, generated and transmitted by a matching engine in response to a multicast transaction message 1600 directed to the matching engine which generates message 1700 in response to the multicast transaction message 1600.

The multicast transaction response message 1700 includes a multicast address 1702 as a message destination address. The multicast destination address 1702 will normally be the multicast address of the gateway group to which the gateway which sent the transaction message being responded to corresponds. The message also includes gateway identifier 1704 which identifies the specific gateway which sent the transaction message to which response message 1700 corresponds. The information in fields 1702 and 1704 can, and in some embodiments are, obtained by the matching engine that generates message 1700 from multicast transaction message fields 1606, 1608.

Message 1700 also includes ME multicast group identifier 1706 which identifies a multicast group to which the sending matching engine is a member. The sending matching engine is specifically identified by matching engine identifier 1708 that is also included in message 1700. The message 1700 also includes a multicast message identifier 1710 which is generated by the matching engine sending the message. In some embodiments the multicast message identifier 1710 includes a stream identifier 1720 and a message counter value 1722. The multicast message identifier may also include an offset value indicating the increment added to the message counter value of the last multicast message corresponding to the identified stream to generate the current message counter value 1722 included in the message. Thus, the ME can increment the multicast messages corresponding to a stream by increments which may vary and/or be greater than a fixed number such as one. The inclusion of the offset value is optional and not used in all embodiments.

The stream identifier 1720 identifies a specific stream, e.g., a matching engine to trader stream. The message counter value 1722 is normally updated, e.g., changed, each time a message corresponding to the identified stream is sent by the matching engine.

In some embodiments the matching engine generates and sends null transaction response messages corresponding to streams that it is using to send messages on a periodic basis to facilitate detection of the failure to receive a multicast message at a gateway. The null transaction message will normally include a multicast message identifier which was updated relative to the last transaction response message of a stream to which the message corresponds allowing a receiving device to easily determine if any message were not received.

In addition to the multicast message identifier 1710, the multicast transaction response message 1700 includes a client-broker identifier 1712, trader identifier 1714 and/or transaction information 1716. Transaction information 1716, includes in some embodiments, order status and/or completion information 1730, a security identifier 1732, e.g., stock identifier, information on the number of shares traded 1734, information 1736 on the price at which the trades were completed, un-interpreted field information, e.g., client information echo field information 1738, and/or additional transaction information 1740 such as a client order ID which may be the same as the client order ID of the original trader transaction message 1500 and multicast transaction message 1600 generated by the gateway there from, to which the multicast transaction reply message 1700 corresponds.

Figure 18:
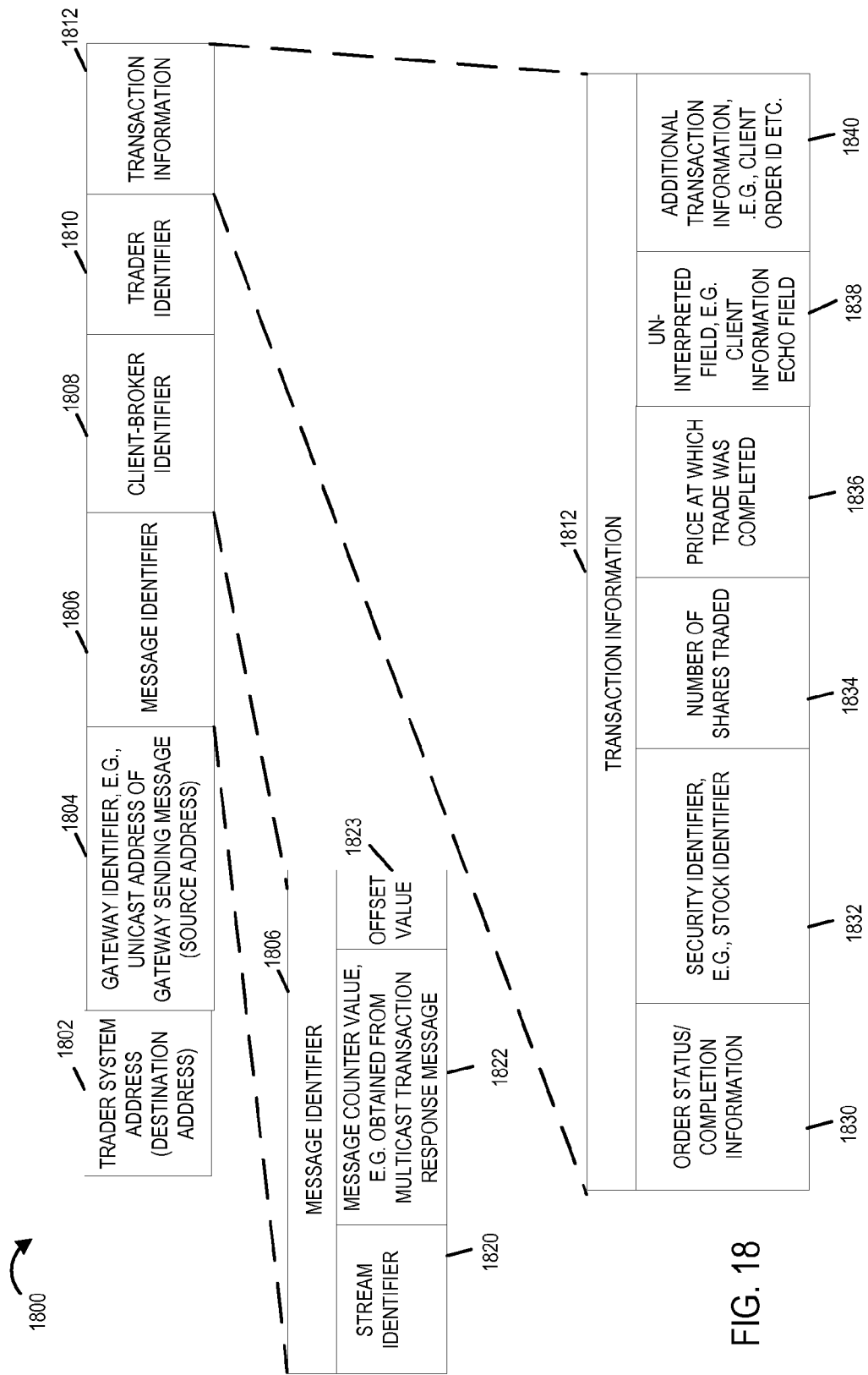
FIG. 18 illustrates an exemplary unicast transaction response message, e.g., communicated from a gateway device to trader system, in accordance with an exemplary embodiment.

FIG. 18 illustrates an exemplary unicast transaction response message 1800. The exemplary unicast transaction response message 1800 is similar in content and format to the unicast transaction message 1500 which is already been described. The unicast transaction response message 1800 may, and in some embodiments is, generated and transmitted by a gateway in response to a received multicast transaction response message 1700.

The unicast transaction response message 1800 includes a trader system 1802 as a message destination address. The destination address 1802 will normally be the address of the trader system, e.g., trader system 112, to which sent the transaction message, e.g., unicast transaction message 1500, being responded to corresponds. The message 1800 also includes gateway identifier 1804, e.g., a unicast address of the specific gateway, e.g., gateway 138, sending the transaction response message 1800.

The message 1800 also includes a message identifier 1806. In some embodiments the message identifier 1806 includes a stream identifier 1820 and a message counter value 1822. The message identifier 1810 may, and in some embodiments does, also include an offset value 1823 indicating the increment added to the message counter value of the last response message corresponding to the identified stream to generate the current message counter value 1822 included in the message 1800. The message counter value 1822 will normally be the same as the message counter value 1722 of the multicast transaction response message from which the unicast transaction response message is generated.

The stream identifier 1820 identifies a specific stream, e.g., a matching engine to trader stream. The message counter value 1822, e.g., obtained from the multicast transaction response message, is normally updated, e.g., changed, each time a message corresponding to the identified stream is sent by the matching engine.

In addition to the message identifier 1806, the unicast transaction response message 1800 includes a client-broker identifier 1808, trader identifier 1810 and/or transaction information 1812. Transaction information 1812, includes in some embodiments, order status and/or completion information 1830, a security identifier 1832, e.g., stock identifier, information on the number of shares traded 1834, information 1836 on the price at which the trades were completed, un-interpreted field information 1838, e.g., client information echo field information, and/or additional transaction information 1840 such as a client order ID which may be the same as the client order ID of the original trader transaction message 1500 to which the unicast transaction reply message 1800 corresponds.

In various embodiments the information supplied by the client device, e.g., trader system 112, in uninterpreted field 1538 of unicast transaction message 1500 is returned, e.g., echoed back without alteration, in a unicast transaction response message 1800, which is in response to unicast transaction message 1500. In some such embodiments, the information in uninterpreted fields (1538, 1638, 1738, 1838) of messages (1500, 1600, 1700, 1800) is identical corresponding to the same transaction.

In one example, transaction message 828 of FIG. 8 is a unicast transaction message in accordance with the format of message 1500 of FIG. 15, and transaction response messages (834, 840, 846) are unicast transaction response messages in accordance with the format of message 1800 of FIG. 18. In some embodiments, first device 138, e.g., a client gateway, generates a multicast transaction message in accordance with the format of message 1600 of FIG. 16 in response to received unicast transaction message 828 and based on information provided in unicast transaction message 828. In some embodiments, first device 138, e.g., a client gateway, generates unicast transaction response messages (834, 840, 846) in response to three received multicast transaction messages which were in accordance with the format of multicast transaction response message 1700 and based on information provided in three multicast transaction response message, respectively.

Methods and apparatus are described for facilitating communication of previously transmitted messages which were lost by either a trading system or ECN during a communications session.

In accordance with various exemplary embodiment, trading related messages, e.g., order messages and replies, are transmitted over a high speed communications path within an exchange system, e.g., an ECN. Multiple trading systems may share the same high speed communications path. The high speed communications path is a low latency communication path in several embodiments allowing transactions to be communicated and implemented quickly in a reliable manner.

When the loss of one or more messages is detected by the trader system or the ECN, e.g., based on a sequence of message number differing from what was expected, the trader system or ECN missing one or more messages corresponding to a communications session is provided the messages via a communication path which is different from the communications path used to submit new orders. An expected message number may be generated by adding a predetermined offset value or an offset value indicated in a received message to the message number of the last message that was received corresponding to the stream to which the message being processed was received. The supply of the missing messages may occur over a secondary communications path which is different from the high sped communications path used to communicate new orders. The secondary communications path may support a higher data rate with the trader system than the high speed data path. In some embodiments, while the secondary path supports a higher data rate with the trader system, allowing for the reply of a large number of messages, the latency on the secondary data path may be higher than that of the high speed communications path.

In addition to using the secondary, high bandwidth communications path for message replay operations to restore synchronization, in some embodiments different physical hardware, e.g., a message storage and reply device, which is different from the hardware used to service, e.g., perform order matching, for new orders, is used to communicate the supply the missing messages as part of a reply operation.

Thus, by using different communications paths and different physical hardware to support message replay operations than service new orders, processing and communication of new order messages and corresponding replies is not delayed by message re-synchronization operations such as message replay operations.

Once message synchronization is restored via use of the secondary communications path, message communication, e.g., the communication of new orders and reply messages, proceeds using the high speed communications path within the ECN.

Thus, various methods and apparatus described herein can be used to reduce or limit the affect of the need to replay messages and/or otherwise restore message synchronization with a trader system on other traders who may share a high speed communications path used to place orders with an ECN.

In some embodiments the uninterpreted field is used to communicate a value or information which is meaningful or used by the client or broker corresponding to the message. In some but not necessarily all embodiments the uninterpreted field provides no information to the exchange system and the content of the uninterpreted field is not used to control message processing in the exchange or provide information to the exchange.

In some but not necessarily all embodiments, the client device, e.g., trader device, includes in the uninterpreted field information which has no meaning and or informational value to the exchange system or devices included therein but which provides information which is meaningful to the client and/or broker. Thus, while the exchange may control the numbering used in the messages sent by the client, the client is able to include an identifier and/or other information which can be interpreted by the client and/or broker. The information can be used to allow a broker to correlate orders and/or other transactions to a particular client and/or trade and may include identification information which is meaningful within the broker's system. While the devices in the exchange system pass the content of the uninterpreted message field they do not interpret the content of this field or use the content in making exchange processing decisions. In essence, the exchange system merely passes the content of the uninterpreted message field back to a device when it sends a response message in response to a transaction message which included the particular field. Thus, while the exchange can control message number the client device is allowed to include additional numbers and/or other information which it uses to track and/or identify orders and which may also be used by the broker associated with the client and/or trader which sends the message.

A broker and/or trader system can request messages corresponding to an individual on whose behalf transaction messages have been sent by requesting messages from the exchange system's message logging system using the broker's and/or traders knowledge of the relationship between client order numbers corresponding to the individual for whom messages are being requested and the message numbering used by the exchange system.

While client order numbers are shown in some messages as being part of the additional transaction information, in many embodiments the client order number information is included within the uninterpreted field of transaction messages sent to the exchange system in which case the client order numbers are not interpreted or used by the exchange system but are echoed back in any transaction response messages generated by the exchange system in response to the transaction message which supplied the client order number in the uninterpreted field of the transaction message.

From the above discussion it should be appreciated that numerous variations and embodiments are possible.

The techniques of various embodiments may be implemented using software, hardware and/or a combination of software and hardware. Various embodiments are directed to apparatus, e.g., gateways, severs, nodes, terminals, etc. Various embodiments are also directed to methods, e.g., methods of performing risk checking. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal receiving, processing, generation and/or transmission steps. Thus, in some embodiments various features are implemented using modules. Such modules may be implemented using software, hardware or a combination of software and hardware. Thus, in at least some embodiments the modules are hardware modules. Many of the above described methods or method steps can be implemented using machine, e.g., computer, executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., control node, including a processor configured to implement one, multiple or all of the steps of one or more methods of the invention.

In some embodiments, the processor or processors, e.g., CPUs, of one or more devices, e.g., gateway or other node, are configured to perform one or more of the steps of the methods described herein. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., node, with a processor which includes a module corresponding to each of the steps of the various described methods performed by the device in which the processor is included. In some but not all embodiments a device, e.g., node, includes a module corresponding to each of the steps of the various described methods performed by the device in which the processor is included. The modules may be implemented using software and/or hardware.

Some embodiments are directed to a computer program product comprising a non-transitory computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a node. The code may be in the form of machine, e.g., computer, executable instructions stored on a non-transitory computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device, control device or other device described in the present application.

To the extent that any incorporated applications included language or descriptions of system elements which are contrary to the language or description of embodiments or elements described herein, the language and descriptions included in the text of the present application is to be deemed controlling.

While described in the context of a trading system, at least some of the methods and apparatus of various embodiments are applicable to a wide range of systems.

What is claimed is:

1. A method of operating a message processing system, the method comprising:
   receiving at a first device including a processor, said first device being in the message processing system, a first message from a first system which sends messages to said message processing system, said first message being communicated via a first communications path, said first communications path including a shared high speed low latency link in said message processing system over which new transaction messages are communicated, said shared high speed low latency link being shared with other systems which send transaction messages to the message processing system;
   determining, in the first device, that said first system requires a message gap fill to fill a message gap; and
   in response to determining that said first system requires a message gap fill, sending, from the first device, a signal to a second device to trigger said second device to supply one or more previously transmitted messages to the first system via a second communications path to fill said message gap, said second device being separate from said first system, said second communications path being used to communicate previously transmitted messages to said first system to fill said message gap, said second communications path avoiding the shared high speed low latency link over which new transaction messages are communicated.

2. The method of claim 1, wherein determining that said first system requires a message gap fill includes:
   receiving a gap fill request message from said first system requesting one or more previous messages that were previously sent to said first system; and
   determining from the gap fill request message that said first system requires said one or more previous messages to be provided as part of a gap fill operation.

3. The method of claim 1,
   wherein said second device is a message logging device; and
   wherein said first device is a gateway and wherein said second communications path bypasses said gateway.

4. The method of claim 2, wherein said gap fill request message includes multiple stream identifiers, each of the multiple stream identifiers corresponding to a different matching engine group from which a message was sent to said first system.

5. The method of claim 3,
   wherein said first communications path includes a security switch which is part of said message processing system;
   wherein said shared high speed low latency link couples said first device to said second communications device;
   wherein said second communications path also includes said security switch; and
   wherein a path between the first system and said security switch is included in each of the first and second communications paths and is the same for the first communications path which is used for new transaction messages and the second communications path used to provide previously transmitted messages to the first system to fill said message gap.

6. The method of claim 5,
   wherein said message processing system is an exchange system which implements stock trades;
   wherein said first system is a first trader system;
   wherein determining, in the first device, that said first system requires a message gap fill includes determining that a number of received messages indicated in said received message is less than a number of messages that were sent to the first system;
   wherein the second communications path includes a second link which has a higher latency and a higher data rate to said first system than is provided by said shared high speed low latency link included in the first communications path, said second link being outside said first communications path.

7. The method of claim 6 wherein said lower latency over the first communications path is achieved by limiting the amount of data corresponding to an individual client device that can be sent over the shared high speed low latency link in a continuous burst to an amount which is less than the amount of data corresponding to an individual client device that can be sent in a single burst over said second link.

8. The method of claim 1, further comprising:
operating the second device to send a signal to the first device indicating that the first system and said message processing system have restored message synchronization once one or more missing messages have been sent.

9. The method of claim 1, wherein each transaction message includes an indication of the number of messages already received by said first system as part of a trading session.

10. The method of claim 9, wherein determining that said first system requires a message gap fill includes:
determining that a number of received messages indicated in said received message is less than the number of messages sent to the first system; and
wherein said second device is a message logging device including stored messages corresponding to said trading session.

11. A message processing system comprising:
a first device in said message processing system; and
a second device in said message processing system;
wherein said first device includes:
a receiver module configured to receive a first message from a first system which sends messages to said message processing system, said first message being communicated via a first communications path, said first communications path including a shared high speed low latency link in said message processing system over which new transaction messages are communicated, said shared high speed low latency link being shared with other systems which send transaction messages to the message processing system;
a determination module configured to determine that said first system requires a message gap fill to fill a message gap in response to a number of received messages indicated in said received message being less than a number of messages that were previously sent to the first system; and
a transmission module configured to send, in response to determining that said trader system requires a message gap fill, a signal to said second device to trigger said second device to supply one or more previously transmitted messages to the trader system via a second communications path to fill said message gap, said second device being separate from said first system, said second communications path being used to communicate previously transmitted messages to said first system to fill said message gap, said second communications path avoiding the shared high speed low latency link over which new transaction messages are communicated.

12. The message processing system of claim 11, wherein said determination module includes:
a module configured to receive a gap fill request message from said first system requesting one or more previous messages that were previously sent to said first system; and
a module configured to determine from the gap fill request message that said first system requires said one or more previous messages to be provided as part of a gap fill operation.

13. The message processing system of claim 11, wherein said second device is a message logging device; and wherein said first device is a gateway and wherein said second communications path bypassing the gateway device.

14. The message processing system of claim 12, wherein said gap fill request message includes multiple stream identifiers, each of the multiple stream identifiers corresponding to a different matching engine group from which a message was sent to said first system.

15. The message processing system of claim 13,
wherein said first communications path includes a security switch which is part of said message processing system;
wherein said low latency link couples said first device to said second communications device;
wherein said second communications path also includes said security switch; and
wherein a path between the first system and said security switch is included in each of the first and second communications paths and is the same for the first communications path which is used for new transaction messages and the second communications path used to provide previously transmitted messages to the first system to fill said message gap.

16. The message processing system of claim 11, wherein said message processing system is an exchange system which implements stock trades; and
wherein said first system is a first trader system.

17. The message processing system of claim 16, wherein said second device includes:
a module configured to operate the second device to send a signal to the first device indicating that the trader system and said message processing system have restored message synchronization once one or more missing messages have been sent.

18. A message processing system comprising:
a shared high speed low latency link;
a first processor configured to:
receive at a first device in the message processing system, a first message from a first system which sends messages to said message processing system, said first message being communicated via a first communications path, said first communications path including said shared high speed low latency link in said message processing system over which new transaction messages are communicated, said shared high speed low latency link being shared with other systems which send transaction messages to the message processing system;
determine that said first system requires a message gap fill to fill a message gap in response to a number of received messages indicated in said received message being less than a number of messages that were previously sent to the first system; and
send, in response to determining that said first system requires a message gap fill, a signal to a second device to trigger said second device to supply one or more previously transmitted messages to the first system via a second communications path to fill said message gap, said second device being separate from said first system, said second communications path being used to communicate previously transmitted messages to said first system to fill said message gap, said second communications path avoiding the shared high speed low latency link over which new transaction messages are communicated; and
a first memory coupled to said first processor.

19. The message processing system of claim 18, wherein said first processor is further configured to:

receiving a gap fill request message from said trader system requesting one or more previous messages that were previously sent to said trader system; and determining from the gap fill request message that said first system requires said one or more previous messages to be provided as part of a gap fill operation, as part of being configured to determine that said first system requires a message gap fill.

20. The method of claim 1, further comprising:

operating the second device to supply said one or more previously transmitted messages to the first system via the second communications path to fill said message gap, said one or more previously transmitted messages being messages that were previously transmitted from the communications system to the first system.

21. The message processing system claim 11, wherein the second device is a message logging device including memory including one or more previously transmitted messages and a processor, said processor controlling the message logging device to transmit said one or more messages to said trader system via the second communications path, said one or more previously transmitted messages being messages that were previously transmitted from the communications system to the first system.

22. The method of claim 1, further comprising:

operating the second device to send a message to the first device indicating that message synchronization has been restored after said second device communicates said one or more previously transmitted messages to the first system via the second communications path.

23. The method of claim 22 wherein sending, from the first device, a signal to a second device to trigger said second device to supply one or more previously transmitted messages to the first system via a second communications path to fill said message gap includes:

sending said signal to the second device via an interconnect switch in said message processing system;

wherein said second communications path includes said interconnect switch; and wherein operating the second device to send a message to the first device indicating that message synchronization has been restored includes sending said message to the first device indicating that message synchronization has been restored via the interconnect switch.

24. The message processing system of claim 18, further comprising:

a second link which has a higher latency and a higher data rate to said first system than is provided by said shared high speed low latency link included in the first communications path, said second link being outside said first communications path.

25. The message processing system of claim 24, wherein said second link is part of said second communications path; and wherein said second communications path bypasses the first device.

* * * * *